(12) United States Patent
Marjanovic et al.

(10) Patent No.: US 9,687,936 B2
(45) Date of Patent: Jun. 27, 2017

(54) TRANSPARENT MATERIAL CUTTING WITH ULTRAFAST LASER AND BEAM OPTICS

(71) Applicant: Corning Incorporated, Corning, NY (US)

(72) Inventors: Sasha Marjanovic, Painted Post, NY (US); Garrett Andrew Piech, Corning, NY (US); Sergio Tsuda, Horseheads, NY (US); Robert Stephen Wagner, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/529,801

(22) Filed: Oct. 31, 2014

(65) Prior Publication Data

US 2015/0166397 A1    Jun. 18, 2015

Related U.S. Application Data

(60) Provisional application No. 61/917,140, filed on Dec. 17, 2013, provisional application No. 62/022,888, filed on Jul. 10, 2014.

(51) Int. Cl.
*C03B 33/02*  (2006.01)
*B23K 26/00*  (2014.01)
(Continued)

(52) U.S. Cl.
CPC ...... *B23K 26/0057* (2013.01); *B23K 26/0624* (2015.10); *B23K 26/382* (2015.10); *C03B 33/0222* (2013.01)

(58) Field of Classification Search
CPC .................................................. C03B 33/0222
See application file for complete search history.

(56) References Cited

U.S. PATENT DOCUMENTS

| 1,790,397 A | 1/1931 | Woods et al. |
| 3,647,410 A | 3/1972 | Heaton et al. |

(Continued)

FOREIGN PATENT DOCUMENTS

| CN | 102672355 A | 9/2012 |
| CN | 102672355 B | 5/2015 |

(Continued)

OTHER PUBLICATIONS

E. Vanagas et al., "Glass Cutting by Femtosecond Pulsed Radiation", J. Microlith., Microfa., Microsyst., 3(2) 358-363, 2004.
(Continued)

*Primary Examiner* — Erin Snelting
(74) *Attorney, Agent, or Firm* — Michael G. Panian; Svetlana Z. Short

(57) ABSTRACT

A system for laser drilling of a material includes a pulsed laser configured to produce a pulsed laser beam having a wavelength less than or equal to about 850 nm, the wavelength selected such that the material is substantially transparent at this wavelength. The system further includes an optical assembly positioned in the beam path of the laser, configured to transform the laser beam into a laser beam focal line oriented along the beam propagation direction, on a beam emergence side of the optical assembly.

41 Claims, 18 Drawing Sheets

(51) Int. Cl.
*B23K 26/382* (2014.01)
*B23K 26/0622* (2014.01)

(56) References Cited

U.S. PATENT DOCUMENTS

| | | |
|---|---|---|
| 3,775,084 A | 11/1973 | Heaton |
| 4,646,308 A | 2/1987 | Kafka et al. |
| 4,764,930 A | 8/1988 | Bille et al. |
| 4,907,586 A | 3/1990 | Bille et al. |
| 4,918,751 A | 4/1990 | Pessot et al. |
| 5,040,182 A | 8/1991 | Spinelli et al. |
| 5,265,107 A | 11/1993 | Delfyett, Jr. |
| 5,400,350 A | 3/1995 | Galvanauskas |
| 5,436,925 A | 7/1995 | Lin et al. |
| 5,553,093 A | 9/1996 | Ramaswamy et al. |
| 5,586,138 A | 12/1996 | Yokoyama |
| 5,696,782 A | 12/1997 | Harter et al. |
| 5,736,709 A | 4/1998 | Neiheisel |
| 5,776,220 A | 7/1998 | Allaire et al. |
| 6,016,324 A | 1/2000 | Rieger et al. |
| 6,038,055 A | 3/2000 | Hänsch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,210,401 B1 | 4/2001 | Lai |
| 6,256,328 B1 | 7/2001 | Delfyett et al. |
| 6,272,156 B1 | 8/2001 | Reed et al. |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,729,161 B1 | 5/2004 | Miura et al. |
| 6,992,026 B2 | 1/2006 | Fukuyo et al. |
| 7,353,829 B1 | 4/2008 | Wachter et al. |
| 8,168,514 B2 | 5/2012 | Garner et al. |
| 8,916,798 B2 | 12/2014 | Plüss |
| 9,296,066 B2 * | 3/2016 | Hosseini ............ B23K 26/0057 |
| 2002/0046997 A1 | 4/2002 | Nam et al. |
| 2003/0006221 A1 | 1/2003 | Hong et al. |
| 2005/0024743 A1 | 2/2005 | Camy-Peyret |
| 2005/0098548 A1 | 5/2005 | Kobayashi et al. |
| 2005/0274702 A1 | 12/2005 | Deshi |
| 2006/0109874 A1 | 5/2006 | Shiozaki et al. |
| 2008/0000884 A1 | 1/2008 | Sugiura et al. |
| 2010/0086741 A1 | 4/2010 | Bovatsek et al. |
| 2010/0089882 A1 | 4/2010 | Tamura |
| 2010/0252540 A1 | 10/2010 | Lei et al. |
| 2010/0252959 A1 | 10/2010 | Lei et al. |
| 2012/0145331 A1 * | 6/2012 | Gomez ............... C03B 33/0222 156/712 |
| 2012/0196071 A1 | 8/2012 | Cornejo et al. |
| 2012/0234807 A1 | 9/2012 | Sercel et al. |
| 2012/0255935 A1 | 10/2012 | Kakui et al. |
| 2013/0068736 A1 | 3/2013 | Mielke et al. |
| 2013/0126573 A1 | 5/2013 | Hosseini et al. |
| 2013/0323469 A1 | 12/2013 | Abramov et al. |
| 2014/0199519 A1 | 7/2014 | Schillinger et al. |
| 2015/0038313 A1 * | 2/2015 | Hosseini ............ B23K 26/0039 501/32 |
| 2015/0140241 A1 * | 5/2015 | Hosseini ............ B23K 26/0617 428/34.4 |
| 2015/0140735 A1 * | 5/2015 | Hosseini ............. B81C 1/00634 438/107 |
| 2015/0158120 A1 | 6/2015 | Courvoisier et al. |

FOREIGN PATENT DOCUMENTS

| | | | |
|---|---|---|---|
| DE | 102013223637 A1 * | 5/2015 | ......... B23K 26/0054 |
| EP | 0609978 A1 | 8/1994 | |
| EP | 2754524 B1 | 7/2014 | |
| FR | 2989294 A1 | 10/2013 | |
| JP | 6318756 | 11/1994 | |
| JP | 11197498 | 7/1999 | |
| JP | 11269683 | 10/1999 | |
| JP | 11330597 | 11/1999 | |
| JP | 11347758 | 12/1999 | |
| JP | 2005288503 | 10/2005 | |
| JP | 2006130691 A | 5/2006 | |
| JP | 2007021548 A | 2/2007 | |
| KR | 1120471 B1 | 3/2012 | |
| WO | 9929243 A1 | 7/1999 | |
| WO | 9963900 A1 | 12/1999 | |
| WO | 2010129459 A2 | 11/2010 | |
| WO | 2011/025908 | 3/2011 | |
| WO | 2012006736 A2 | 1/2012 | |
| WO | 2012108052 A1 | 8/2012 | |
| WO | 2013022148 A1 | 2/2013 | |
| WO | 2013138802 A1 | 9/2013 | |
| WO | 2013153195 A1 | 10/2013 | |
| WO | 2014/079478 | 5/2014 | |
| WO | 2014/079570 | 5/2014 | |
| WO | 2014111385 A1 | 7/2014 | |

OTHER PUBLICATIONS

M. K. Bhuyan, et al., High aspect ratio taper-free microchannel fabrication using femtosecond Bessel beams, Jan. 18, 2010 / vol. 18, No. 2 / Optics Express 566.

Design of Diffractivephase Axicon Illuminated by a Gaussian-Profile Beam, Zhangg Uo-Qing, D Ongb I-Zhen,Y Angg Uo-Zhen, and Gu Ben-Yuan, vol. 6, No. 5 Acta Physica Sinica May 1996, pp. 354.

High-resolution optical coherence tomography over a large depth range with an axicon lens, Zhihua Ding, Hongwu Ren, Yonghua Zhao, J. Stuart Nelson, and Zhongping Chen, Feb. 15, 2002 / vol. 27, No. 4 / Optics Letters 243.

Ilya Golub, Fresnel axicon, 1890 Optics Letters / vol. 31, No. 12 / Jun. 15, 2006.

M. K. Bhuyan, et al., High aspect ratio nanochannel machining using single shot femtosecond Bessel beams, Appl. Phys. Lett. 97, 081102 (2010).

Rieko Arimoto, et al., Imaging properties of axicon in a scanning optical system; Nov. 1, 1992 / vol. 31, No. 31 / Applied Optics 6653.

D. Zeng, et al., Characteristic analysis of a refractive axicon system for optical trepanning; Optical Engineering 45(9), 094302 Sep. 2006.

Pavel Polynkin, et al., Extended filamentation with temporally chirped femtosecond Bessel-Gauss beams in air, Jan. 19, 2009 / vol. 17, No. 2 / Optics Express 575.

O.G. Kosareva, et al. Formation of extended plasma channels in a condensed medium upon axicon focusing of a femtosecond laser pulse, Quantum Electronics, 35(11), 1013-1014 (2005).

Kruger, et al., "Laser micromachining of barium aluminum borosilicate glass with pulse durations between 20 fs and 3 ps,", Applied Surface Science, 127-129(1998), 892-898.

Perry, et al., "Ultrashort-Pulse Laser Machining," submitted to ICA of Lasers and Electro-Optics, Preprint Nov. 16-19, 1998, Pub. Jan. 22, 1999, International Congress on Applications of Lasers and Electro-Optics.

Herman, et al., "Laser Micromachining of 'transparent' fused silica with lps pulses and pulse trains", SPIE Conference, San Jose, CA, Jan. 1999, vol. 3616-0277-786X/99.

Yoshino, et al., "Micromachining with a High Repetition Rate Femtosecond Fiber Laser," Journal of laser Micro/Nanoengineering vol. 3, No. 3, 2008.

Abramov et al., "Laser separation of chemically strengthened glass", Physics Procedia, 5 (2010), 285-290.

PCT Notification of Transmittal of the International Search Report and The Written Opinion of the International Searching Authority, international application No. PCT/US2014/070275; mailing date Apr. 20, 2015, 9 pages.

(56) References Cited

OTHER PUBLICATIONS

PCT Notification Copncerning Transmittal of International Preliminary Report on Patentability, international application No. PCT/US2014/070275; mailing date Jun. 30, 2016, 6 pages.
Abramov et al., "Laser separation of chemically strengthened glass"; Physics Procedia 5 (2010) 285-290, Elsevier.; doi: 10.1016/j.phpro.2010.08.054.
"TruMicro 5000" Product Manual, Trumpf Laser GmbH + Co. KG, pp. 1-4, Aug. 2011.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
"EagleEtch" Product Brochure, EuropeTec USA Inc., pp. 1-8, Aug. 1, 2014.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Krüger et al., "Femtosecond-pulse visible laser processing of transparent materials"; Applied Surface Science 96-98 (1996) 430-438.
Krüger et al., "Laser micromachining of barium aluminium borosilicate glass with pluse durations between 20 fs and 3 ps"; Applied Surface Science 127-129 (1998) 892-898.
Krüger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Perry et al., "Ultrashort-pulse laser machining"; UCRL-JC-132159 Rev 1., Jan. 22, 1999, pp. 1-24.
Perry et al., "Ultrashort-pulse laser machining"; UCRL-ID-132159, Sep. 1998, pp. 1-38.
Perry et al., "Ultrashort-pulse laser machining of dielectric materials"; Journal of Applied Physics, vol. 85, No. 9, May 1, 1999, American Institute of Physics, pp. 6803-6810.
"PHAROS High-power femtosecond laser system" product brochure; Light Conversion, Vilnius, LT; Apr. 18, 2011, pp. 1-2.
Serafetinides et al., "Ultra-short pulsed laser ablation of polymers"; Applied Surface Science 180 (2001) 42-56.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Varel et al., "Micromachining of quartz with ultrashort laser pulses"; Applied Physics A 65, 367-373, Springer-Verlag (1997).
Yoshino et al., "Micromachining with a high repetition rate femtosecond fiber laser"; JLMN—Journal of Laser Micro/Nanoengineering vol. 3, No. 3 (2008), pp. 157-162.
http://www.gtat.com/Collateral/Documents/English-US/Sapphire/12-21-12_GT_TouchScreen_V3 web.pdf, "GT ASF® Grown Sapphire Cover and Touch Screen Material" accessed Nov. 19, 2014, 2 pgs.

* cited by examiner

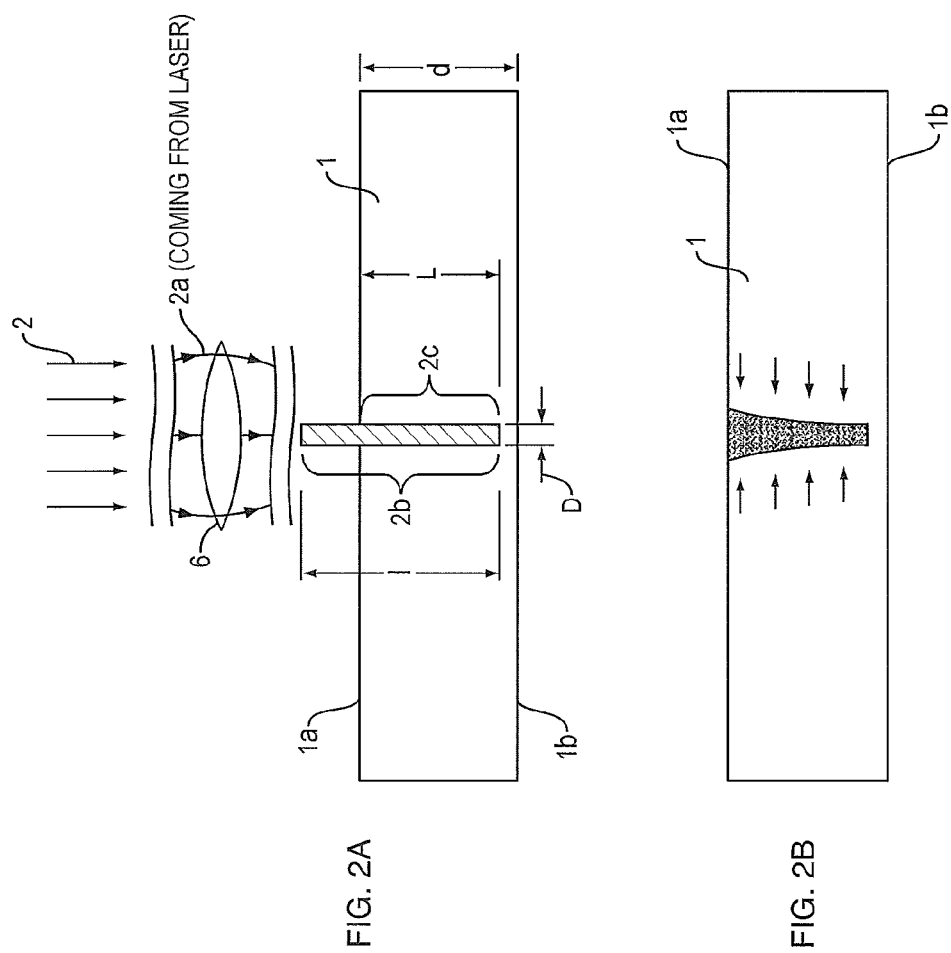

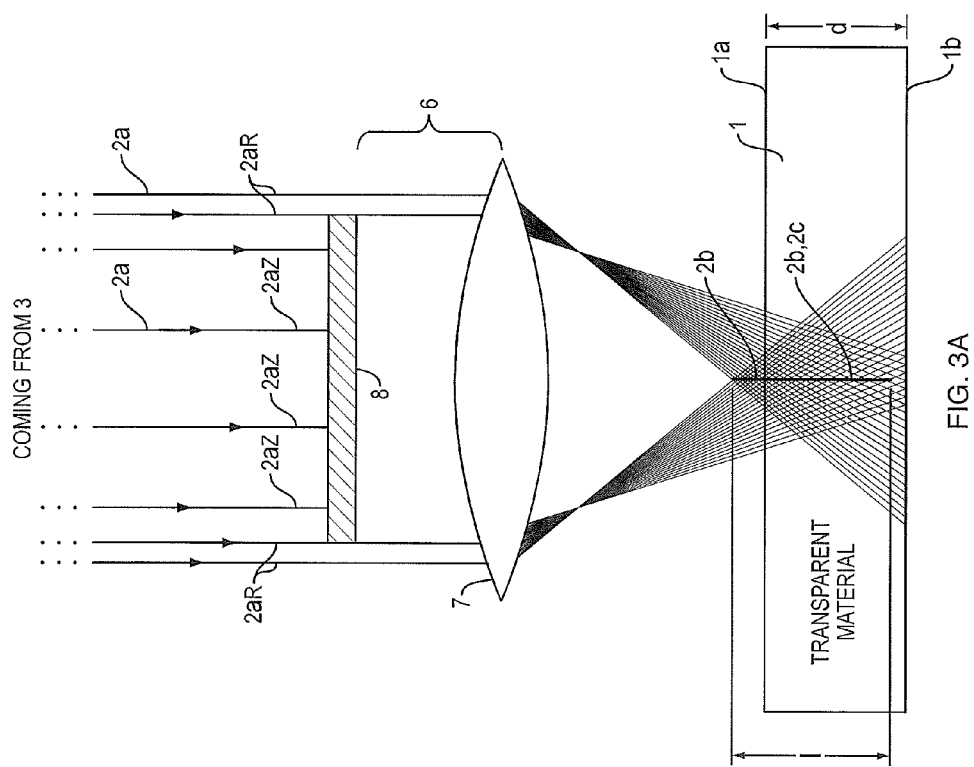

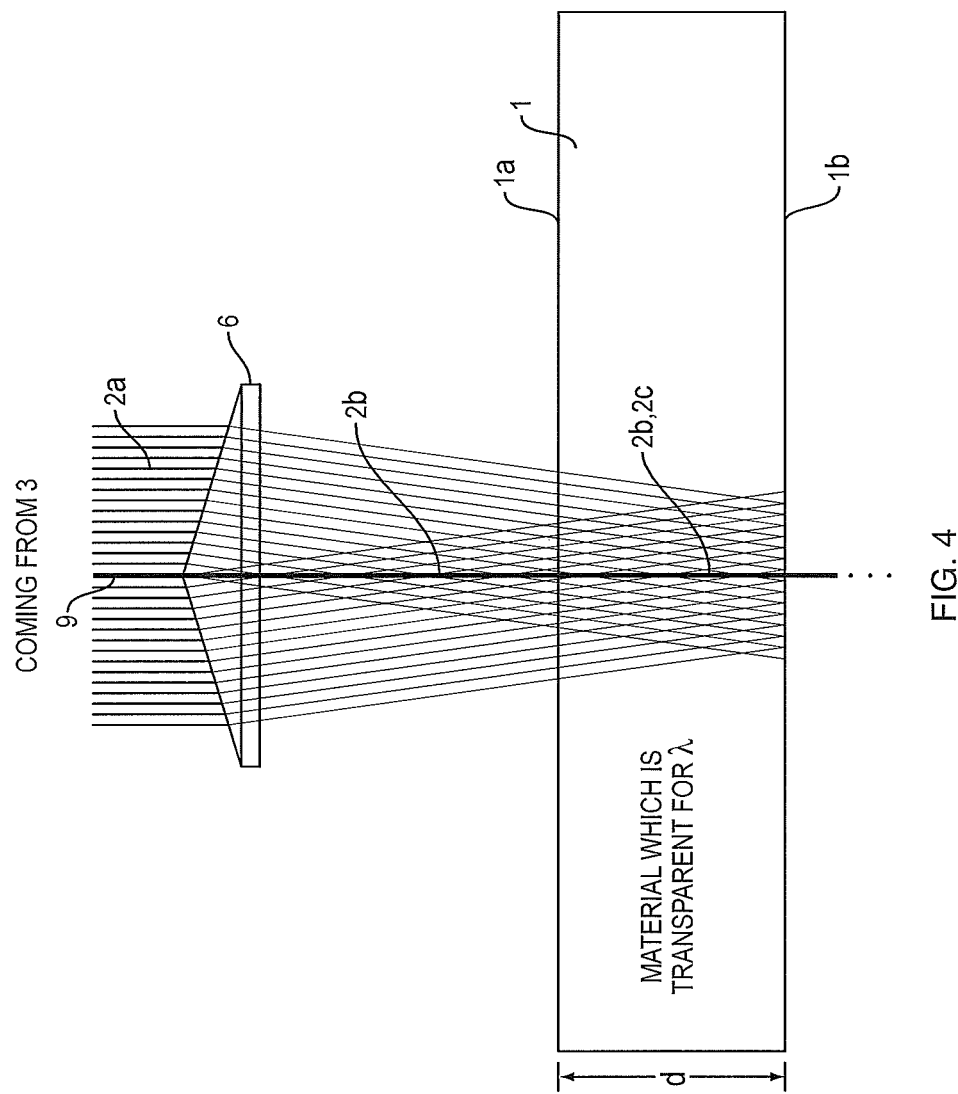

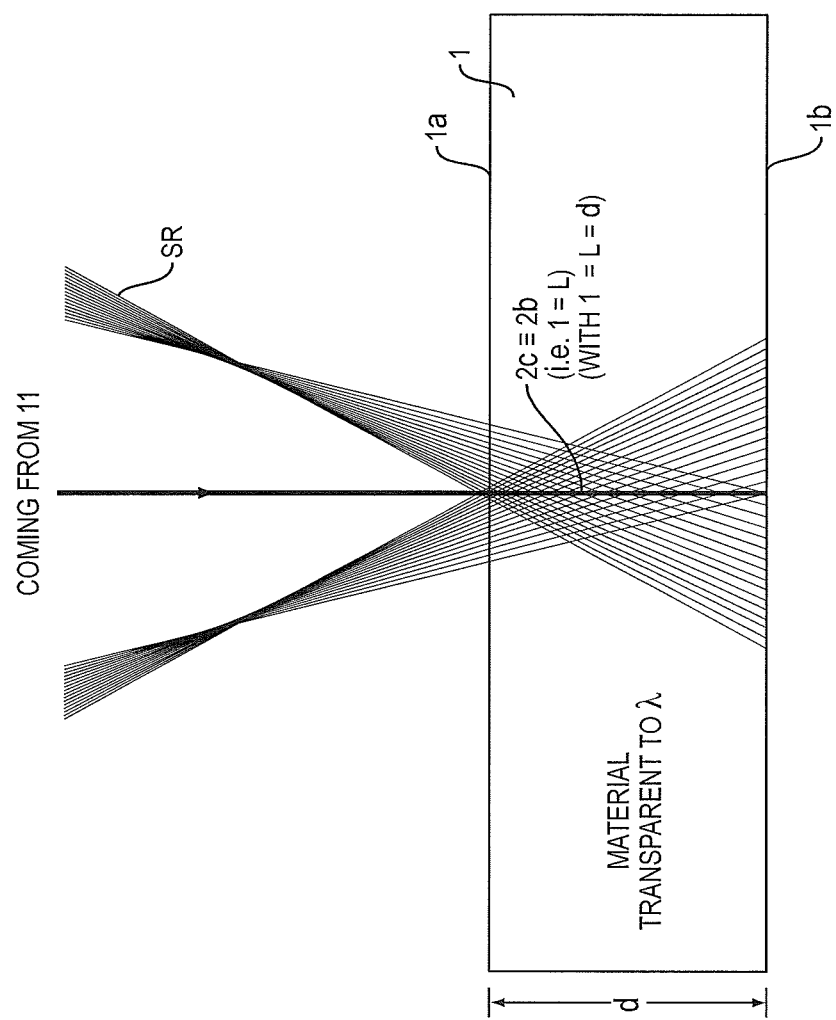

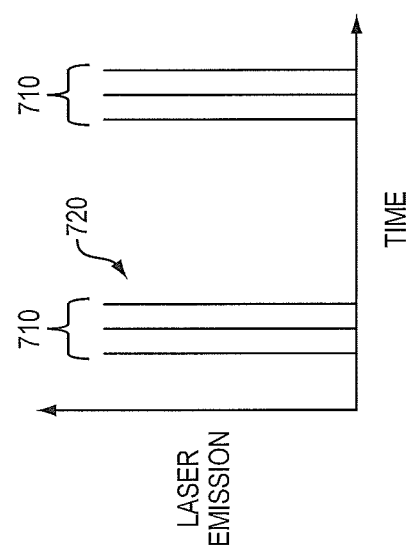

TRANSPARENT MATERIAL CUTTING WITH ULTRAFAST LASER AND BEAM OPTICS

RELATED APPLICATIONS

This application claims the benefit of U.S. Provisional Application No. 61/917,140 filed on Dec. 17, 2013 and U.S. Provisional Application No. 62/022,888 filed on Jul. 10, 2014. The entire teachings of these applications are incorporated herein by reference.

BACKGROUND

In recent years, precision micromachining and its improvement of process development to meet customer demand to reduce the size, weight and material cost of leading-edge devices has led to fast pace development in high-tech industries in flat panel displays for touch screens, tablets, smartphones and TVs, leading to ultrafast industrial lasers becoming important tools for applications requiring high precision.

There are various known ways to cut glass. In a conventional laser glass cutting process, the separation of glass relies on laser scribing or perforation with separation by mechanical force or thermal stress induced crack propagation. Nearly all current laser cutting techniques exhibit one or more shortcomings: (1) they are limited in their ability to perform a free form shaped cut of thin glass on a carrier due to a large heat-affected zone (HAZ) associated with long pulse lasers (nanosecond scale or longer), (2) they produce a thermal stress that often results in cracking of the surface near the laser illuminated region due to a shock wave and uncontrolled material removal and, (3) the process creates sub-surface damage extending tens of microns (or more) into the body of the material resulting in defect sites which can become crack sources.

Therefore, there is a need for an improved process of laser drilling a material, such as glass that minimizes or eliminates one or more of the above mentioned problems, that minimizes or eliminates the above mentioned problems.

SUMMARY

The following embodiments relate to a method and an apparatus to create small (micron and smaller) "holes" or defect lines in transparent materials (e.g., glass, sapphire, etc.) for the purpose of drilling and cutting.

More particularly, according to some embodiments, a pulsed laser beam having a wavelength less than 1000 nm is focused into a laser beam focal line, and the focal line is directed into the material, where the laser beam focal line generates an induced absorption within the material, the induced absorption producing a defect line having a diameter less than or equal to about 300 nm along the laser beam focal line within the material. For example, an ultra-short (e.g., $10^{-10}$ to $10^{-15}$ second) pulse beam (wavelength less than 1000 nanometers (nm) having a Gaussian profile, is shaped and focused to create a linear focal region in the body of the material. The resulting energy density is above the threshold for material modification, creating a "defect line" or "hole" in that region. By spacing these features close together, the material may be separated (mechanically or thermally) along the perforation line. In some embodiments the pulsed laser beam's wavelength is less than or equal to 850 nm, in some embodiments less than or equal to 800 nm, in some embodiments less than 620 nm, and in some embodiments not greater than 552 nm.

For example, according to some embodiments, a pulsed laser beam having a wavelength less than or equal to about 800 nm (±50 nm, preferably ±20 nm, more preferably ±2 nm) such as the laser beam produced by Ti: sapphire laser, less than or equal to about 775 nm (frequency doubled Er-doped fiber laser), less than or equal to about 600 nm (rhodamine based dye laser) and in some embodiments less than or equal to about 532 nm (e.g., 532 nm±20 nm, more preferably ±2 nm), is focused into a laser beam focal line, and the focal line is directed into the material, where the laser beam focal line generates an induced absorption within the material, the induced absorption producing a defect line having a diameter less than or equal to about 300 nm along the laser beam focal line within the material. For example, an ultra-short (e.g., $10^{-10}$ to $10^{-15}$ second) pulse beam (less than or equal to about 800 nm, 775 nm, 600 nm, 532 nm 355 nm, or 266 nm) having a Gaussian profile, is shaped and focused to create a linear focal region in the body of the material. The resulting energy density is above the threshold for material modification, creating a "defect line" or "hole" in that region. By spacing these features close together, the material may be separated (mechanically or thermally) along the perforation line.

In one embodiment, a method of laser drilling a material includes focusing a pulsed laser beam into a laser beam focal line oriented along the beam propagation direction, the laser beam having a wavelength less than or equal to about 850 nm, the wavelength selected such that the material is substantially transparent at this wavelength. The method also includes directing the laser beam focal line into the material, the laser beam focal line generating an induced absorption within the material, the induced absorption producing a defect line having a diameter less than or equal to about 300 nm along the laser beam focal line within the material.

The induced absorption can produce subsurface damage up to a depth less than or equal to about 100 μm (for example less than 75 μm) within the material, and an Ra surface roughness less than or equal to about 0.5 μm. A roughness of a surface can be characterized, for example, by an Ra surface roughness statistic (roughness arithmetic average of absolute values of the heights of the sampled surface).

In some embodiments, the method further includes translating the material and the laser beam relative to each other, thereby drilling a plurality of defect lines within the material, the defect lines spaced apart so as to separate the material into at least two pieces. In certain embodiments, the laser is a pulse burst laser and the repetition rate of the laser bursts (i.e., burst repetition rate) can be in a range of between about 10 kHz and 2000 kHz such as 100 kHz, 200 kHz, 300 kHz, 400 kHz, 500 kHz, 1000 kHz, or 1500 kHz. In some embodiments, the laser beam has a wavelength less than or equal to about 775 nm, less than or equal to about 600 nm, or less than or equal to about 532 nm. In some embodiments, the pulse duration of the individual pulses within a pulse burst of the laser can be in a range of between about 5 picoseconds and about 100 picoseconds, for example 10, 20, 30, 40, 50, 60, 75, 80, 90 or 100 picoseconds, or therebetween.

The pulsed laser can be configured to emit pulses produced in bursts of at least two pulses per burst, the adjacent pulses being separated by a duration in a range of between about 1 nsec and about 50 nsec (more preferably in the range of 15 to 30 nsec) with the burst repetition frequency being in a range of between about 1 kHz and about 500 kHz (and preferably 200 kHz). In some embodiments, the individual pulses within a pulse burst can be separated by a duration of about 20 nsec.

In certain embodiments, the laser beam focal line can have a length L in a range of between about 0.1 mm and about 20 mm, in some embodiments between 10 mm and 20 mm, for example a length in a range of between about 0.1 mm and about 8 mm. The laser beam focal line can have an average spot diameter in a range of between about 0.1 μm and about 5 μm.

In another embodiment, a system for laser drilling of a material includes a pulsed laser configured to produce a pulsed laser beam having a wavelength less than or equal to about 850 nm, the wavelength selected such that the material is substantially transparent at this wavelength. The system further includes an optical assembly positioned in the beam path of the laser, configured to transform the laser beam into a laser beam focal line, oriented along the beam propagation direction, on the beam emergence side of the optical assembly, the optical assembly including a focusing optical element with spherical aberration configured to generate the laser beam focal line. The laser beam focal line can be adapted to generate an induced absorption within the material, the induced absorption producing a defect line having a diameter less than or equal to about 300 nm along the laser beam focal line within the material.

In some embodiments, the laser beam has a wavelength less than or equal to about 775 nm, less than or equal to about 600 nm, or less than or equal to about 532 nm. The induced absorption can produce subsurface damage up to a depth less than or equal to about 75 μm within the material, such as less than or equal to about 40 μm, an Ra surface roughness less than or equal to about 0.8 μm, and a RMS surface roughness less than or equal to about 0.9 μm. The optical assembly can include an annular aperture positioned in the beam path of the laser before the focusing optical element, the annular aperture configured to block out one or more rays in the center of the laser beam so that only marginal rays outside the center are incident upon on the focusing optical element, and thereby only a single laser beam focal line, oriented along the beam direction, is produced for each pulse of the pulsed laser beam. The focusing optical element can be a spherically cut convex lens. Alternatively, the focusing optical element can be a conical prism having a non-spherical free surface, such as an axicon.

In some embodiments, the optical assembly can further include a defocusing optical element, the optical elements positioned and aligned such that the laser beam focal line is generated on the beam emergence side of the defocusing optical element at a distance from the defocusing optical element. Alternatively, the optical assembly can further include a second focusing optical element, the two focusing optical elements positioned and aligned such that the laser beam focal line is generated on the beam emergence side of the second focusing optical element at a distance from the second focusing optical element. The pulsed laser can be configured to emit pulses produced in bursts of at least two pulses (such as, for example, at least 3 pulses, at least 4 pulses, at least 5 pulses, at least 10 pulses, at least 15 pulses, at least 20 pulses, or more). The pulses inside the burst are separated by a duration in a range of between about 1 nsec and about 50 nsec, for example 10 to 30 nsec, such as about 20 nsec, and the burst repetition frequency can be in a range of between about 1 kHz and about 2 MHz, such as a burst repetition frequency of about 100 kHz, about 200 kHz, about 300 kHz, about 400 kHz, about 500 kHz, about 1 MHz, or about 1.5 MHz. (Bursting or producing pulse bursts is a type of laser operation where the emission of pulses is not in a uniform and steady stream but rather in tight clusters of pulses.) The glass is moved relative to the laser beam (or the laser beam is translated relative to the glass) to create perforated lines that trace out the shape of any desired parts. The pulse burst laser beam can have a wavelength selected such that the material is substantially transparent at this wavelength. With a focal line about 1 mm in length, and a 532 nm picosecond laser that produces output power of about 2 W or more at a burst repetition rate of 20 kHz (about 100 microJoules/burst) measured at the glass composition, the optical intensities in the focal line region are high enough to create non-linear absorption in the glass composition The average laser power per burst measured at the material can be greater than 40 microJoules per mm thickness of material, for example between 40 microJoules/mm and 2500 microJoules/mm, or between 500 and 2250 microJoules/mm. For example, for 0.4 mm thick code 2320 glass (available from Corning Incorporated, Corning, N.Y.) one may use 100 μJ pulse bursts to cut and separate the glass, which gives an exemplary range of 250 μJ/mm. The laser beam focal line can have a length in a range of between 0.1 mm and 20 mm, and an average spot diameter in a range of between 0.1 μm and 5 μm.

In another embodiment, a method of laser drilling a material includes focusing a pulsed laser beam into the laser beam focal line oriented along the beam propagation direction, the laser beam having a wavelength less than 850 nm. The method also includes directing the laser beam focal line into the material, the laser beam focal line generating an induced absorption within the material, the induced absorption producing a defect line having an internal diameter less than 0.5 μm along the laser beam focal line within the material. In some embodiments, producing the defect line includes producing the defect line with internal diameter of less than 0.4 μm. In some embodiments, producing the defect line further includes producing the defect line with internal diameter of less than 0.3 μm or 0.2 μm.

These embodiments have many advantages, such as less subsurface damage due to the laser wavelength being less than or equal to about 850 nm, and preferably less or equal to about 532 nm, as compared to prior art laser drilling methods, producing less surface debris, less adhered debris, and less thermal interaction. While laser ablation cutting of thin glasses exhibits slow processing speed due to low output power and pulse energy, it has advantages which include no crack creation near the ablation region, free form shaping, and controllable cutting thickness by adjusting a focal length. It is important for flat panel displays that edge cracking and residual edge stress are avoided in glass substrates, because such substrates almost always break from the edge, even when stress is applied to the center. The high peak power of ultrafast lasers combined with tailored beam delivery can avoid these problems by using cold ablation cutting without measurable heat effect. Laser cutting by ultrafast lasers produces essentially no residual stress in the glass.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 2A and 2B are illustrations of positioning of the laser beam focal line, i.e., the processing of a material transparent for the laser wavelength.

FIG. 3A is an illustration of an optical assembly for laser drilling according to one embodiment.

FIG. 3B1-3B4 are illustrations of various possibilities to process the substrate by differently positioning the laser beam focal line relative to the substrate.

FIG. 4 is an illustration of a second optical assembly for laser drilling according to some embodiments.

FIGS. 5A and 5B are illustrations of a third optical assembly for laser drilling according to some embodiments.

FIG. 7A is a graph of laser emission as a function of time for a picosecond laser. Each emission is characterized by a pulse "burst" which may contain one or more pulses.

FIG. 11B shows a screen shot of Zygo scans of ST2 strength part condition.

DETAILED DESCRIPTION

Figure 1:
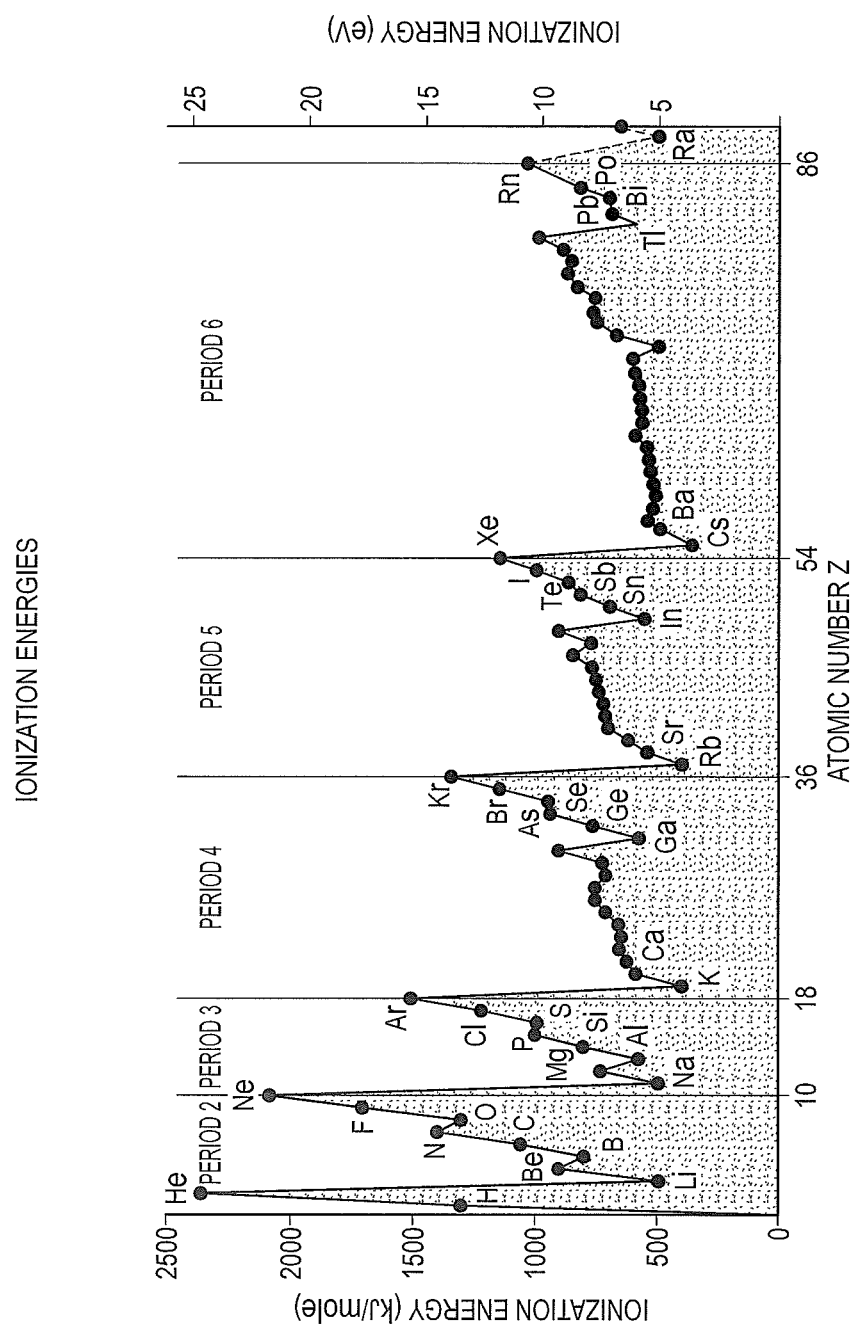
FIG. 1 is a graph of ionization energy as a function of atomic number for several atoms.

A description of example embodiments follows.

Disclosed herein is a method or process, and apparatus for optically producing high precision through-cuts in transparent materials with low sub-surface damage and low debris. In addition, by judicious selection of optics, it is possible to selectively cut individual layers of stacked transparent materials.

Micromachining and cutting thin glasses with minimal sub-surface damage and surface debris is accomplished by selection of an appropriate laser source and wavelength along with beam delivery optics. The laser source consists of an ultrafast laser system providing pulses of sub-nanosecond duration along with a beam delivery that illuminates a "linear" focus region within the body of the transparent material. The energy density along the "linear" focus region needs to be greater than the energy necessary to separate the material in that zone. This necessitates the use of high energy pulsed laser sources.

In addition, the selection of wavelength is important. Materials with stronger molecular bonds will exhibit "better" separation using shorter wavelengths (i.e., less than 1000 nm, such as 850 nm, 820 nm, 800 nm, 775 nm, 600 nm, 532 nm, 355 nm, or 266 nm). Also, the shorter wavelengths focus tighter, resulting in higher volumetric energy densities in the focal region.

Thus, it is possible to create a microscopic (i.e., <0.5 µm and >100 nm in diameter) elongated "hole (also called a perforation or a defect line) in a transparent material using a single high energy burst pulse. These individual perforations can be created at rates of several hundred kilohertz (several hundred thousand perforations per second, for example). Thus, with relative motion between the source and the material, these perforations can be placed adjacent to one another (spatial separation varying from sub-micron to several microns as desired). This spatial separation (pitch) is selected in order to facilitate cutting.

In some embodiments the defect line is a "through hole", which is a hole or an open channel that extends from the top to the bottom of the transparent material. In some embodiments the defect line may not be a continuous channel, and may be blocked or partially blocked by portions or sections of solid material (e.g., glass). As defined herein, the internal diameter of the defect line is the internal diameter of the open channel or the air hole. For example, in embodiments described herein the internal diameter of the defect line is <500 nm, for example≤400 nm, or ≤300 nm, or ≤200 nm. The disrupted or modified area (e.g., compacted, melted, or otherwise changed) of the material surrounding the holes in the embodiments disclosed herein, preferably has diameter of <50 µm (e.g., <0.10 µm).

The selection of the laser source is predicated on the ability to create multi-photon absorption (MPA) in transparent materials. MPA is the simultaneous absorption of two or more photons of identical or different frequencies in order to excite a molecule from one state (usually the ground state) to a higher energy electronic state (ionization). The energy difference between the involved lower and upper states of the molecule is equal to the sum of the energies of the two photons. MPA, also called induced absorption, is a third-order process that is several orders of magnitude weaker than linear absorption. It differs from linear absorption in that the strength of induced absorption depends on the square of the light intensity, and thus it is a nonlinear optical process.

Thus, the laser needs to generate pulse energies sufficient to stimulate MPA in transparent materials over a length of interest. For this application, a laser capable of sourcing 532 nm (or shorter wavelength) light pulses of about 50 µJ or higher energy for each pulse is necessary. Optical elements are selected to produce a laser beam focal line within the body of the transparent material as described below and in U.S. application No. 61/752,489 filed on Jan. 15, 2013, the entire contents of which are incorporated by reference as if fully set forth herein. The pulse energy is then shaped and focused into a linear focal region creating a minimum energy/length of about 100 µJ/mm. Within the focal region (e.g., about 0.5 mm) the energy density is sufficiently high to result in ionization. A photon at a wavelength of 532 nm has an energy of about 2.3 eV. At the atomic level, the ionization of individual atoms has discrete energy requirements as shown in FIG. 1. Several elements commonly used in glass (e.g., Si, Na, K) have relatively low ionization energies (about 5 eV). Without the phenomena of MPA, a wavelength of about 248 nm would be required to create linear ionization at 5 eV. With MPA, these bonds are selectively ionized in the focal region, resulting in separation from the adjacent molecules. This "disruption" in the molecular bonding can result in non-thermal ablation removing material from that region (perforating and thereby creating a defect line). This can be accomplished with a single "burst" of high energy pico-second pulses (spaced close together in time—measured in nano-seconds). These "bursts" may be repeated at high burst repetition rates (e.g., several hundred kHz). The perforations, holes, or defect lines (these three terms are used interchangeably herein) can be spaced apart by controlling the relative velocity of a substrate. For example, the perforations are generally spaced from 0.5 to 15 microns apart (for example, 2-12 microns, or, 5-10 microns). As an example, in a thin transparent substrate moving at 200 mm/sec exposed to a 100 kHz series of pulses, the perforations would be spaced 2 microns apart. This spacing pitch is sufficient to allow for mechanical or thermal separation. It has been noted that resulting debris is deposited in a region local to the "cut" of about 50 microns in length, and the debris is lightly adhered to the surface when the laser wavelength is 532 nm. Particle size of the debris is typically less than about 500 nm.

The interior diameter (open air hole diameter) of the defect line (typically less than about 300 nm) is consistent with the Abbé diffraction limit described below.

Turning to FIGS. 2A and 2B, a method of laser drilling a material includes focusing a pulsed laser beam 2 into a laser beam focal line 2b, oriented along the beam propagation direction. As shown in FIG. 3, laser 3 (not shown) emits laser beam 2, at the beam incidence side of the optical assembly 6 referred to as 2a, which is incident onto the optical assembly 6. The optical assembly 6 turns the incident laser beam into an extensive laser beam focal line 2b on the output side over a defined expansion range along the beam direction (length 1 of the focal line). The planar substrate 1 to be processed is positioned in the beam path after the optical assembly overlapping at least partially the laser beam focal line 2b of laser beam 2. Reference 1a designates the surface of the planar substrate facing the optical assembly 6 or the laser, respectively, reference 1b designates the reverse surface of substrate 1 usually spaced in parallel. The substrate thickness (measured perpendicularly to the planes 1a and 1b, i.e., to the substrate plane) is labeled with d.

As FIG. 2A depicts, substrate 1 is aligned perpendicularly to the longitudinal beam axis and thus behind the same focal line 2b produced by the optical assembly 6 (the substrate is perpendicular to the drawing plane) and oriented along the beam direction it is positioned relative to the focal line 2b in such a way that the focal line 2b viewed in beam direction starts before the surface 1a of the substrate and stops before the surface 1b of the substrate, i.e. still within the substrate. In the overlapping area of the laser beam focal line 2b with substrate 1, i.e. in the substrate material covered by focal line 2b, the extensive laser beam focal line 2b thus generates (in case of a suitable laser intensity along the laser beam focal line 2b which is ensured due to the focusing of laser beam 2 on a section of length 1, i.e. a line focus of length 1) an extensive section 2c viewed along the longitudinal beam direction, along which an induced absorption is generated in the substrate material which induces a defect line or crack formation in the substrate material along section 2c. The crack formation is not only local, but over the entire length of the extensive section 2c of the induced absorption. The length of section 2c (i.e., after all, the length of the overlapping of laser beam focal line 2b with substrate 1) is labeled with reference L. The average diameter or the average extension of the section of the induced absorption (or the sections in the material of substrate 1 undergoing the crack formation) is labeled with reference D. This average extension D basically corresponds to the average diameter δ of the laser beam focal line 2b, that is, an average spot diameter in a range of between about 0.1 μm and about 5 μm.

As FIG. 2A shows, substrate material transparent for the wavelength λ of laser beam 2 is heated due to the induced absorption along the focal line 2b. FIG. 2B outlines that the warming material will eventually expand so that a correspondingly induced tension leads to micro-crack formation, with the tension being the highest at surface 1a.

Concrete optical assemblies 6, which can be applied to generate the focal line 2b, as well as a concrete optical setup, in which these optical assemblies can be applied, are described below. All assemblies or setups are based on the description above so that identical references are used for identical components or features or those which are equal in their function. Therefore only the differences are described below.

As the parting face eventually resulting in the separation is or must be of high quality (regarding breaking strength, geometric precision, roughness and avoidance of re-machining requirements), the individual focal lines to be positioned on the substrate surface along the parting line should be generated using the optical assembly described below (hereinafter, the optical assembly is alternatively also referred to as laser optics). The roughness results particularly from the spot size or the spot diameter of the focal line. In order to achieve a low spot size of, for example, 0.5 μm to 2 μm in case of a given wavelength λ, of laser 3 (interaction with the material of substrate 1), certain requirements must usually be imposed on the numerical aperture of laser optics 6. These requirements are met by laser optics 6 described below.

In order to achieve the required numerical aperture, the optics must, on the one hand, dispose of the required opening for a given focal length, according to the known Abbé formulae (N.A.=n sin (theta), n: refractive index of the glass to be processes, theta: half the aperture angle; and theta=arctan (D/2 f); D: aperture, f: focal length). On the other hand, the laser beam must illuminate the optics up to the required aperture, which is typically achieved by means of beam widening using widening telescopes between laser and focusing optics.

The spot size should not vary too strongly for the purpose of a uniform interaction along the focal line. This can, for example, be ensured (see the embodiment below) by illuminating the focusing optics only in a small, circular area so that the beam opening and thus the percentage of the numerical aperture only vary slightly.

According to FIG. 3A (section perpendicular to the substrate plane at the level of the central beam in the laser beam bundle of laser radiation 2; here, too, laser beam 2 is incident perpendicularly to the substrate plane, i.e. angle β is 0° so that the focal line 2b or the extensive section of the induced absorption 2c is parallel to the substrate normal), the laser radiation 2a emitted by laser 3 is first directed onto a circular aperture 8 which is completely opaque for the laser radiation used. Aperture 8 is oriented perpendicular to the longitudinal beam axis and is centered on the central beam of the depicted beam bundle 2a. The diameter of aperture 8 is selected in such a way that the beam bundles near the center of beam bundle 2a or the central beam (here labeled with 2aZ) hit the aperture and are completely absorbed by it.

Only the beams in the outer perimeter range of beam bundle 2a (marginal rays, here labeled with 2aR) are not absorbed due to the reduced aperture size compared to the beam diameter, but pass aperture 8 laterally and hit the marginal areas of the focusing optic elements of the optical assembly 6, which is designed as a spherically cut, bi-convex lens 7 here.

Lens 7 centered on the central beam is deliberately designed as a non-corrected, bi-convex focusing lens in the form of a common, spherically cut lens. Put another way, the spherical aberration of such a lens is deliberately used. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2b, subject to the distance from the lens center. The diameter of aperture 8 across the beam direction is approximately 90% of the diameter of the beam bundle (beam bundle diameter defined by the extension to the decrease to 1/e) and approximately 75% of the diameter of the lens of the optical assembly 6. The focal line 2b of a not aberration-corrected spherical lens 7 generated by blocking out the beam bundles in the center is thus used. FIG. 3A shows the section in one plane through the central beam, the complete three-dimensional bundle can be seen when the depicted beams are rotated around the focal line 2b.

One disadvantage of this focal line is that the conditions (spot size, laser intensity) along the focal line, and thus along the desired depth in the material, vary and that therefore the desired type of interaction (no melting, induced absorption, thermal-plastic deformation up to crack formation) may possibly only be selected in a part of the focal line. This means in turn that possibly only a part of the incident laser light is absorbed in the desired way. In this way, the efficiency of the process (required average laser power for the desired separation speed) is impaired on the one hand, and on the other hand the laser light might be transmitted into undesired deeper places (parts or layers adherent to the substrate or the substrate holding fixture) and interact there in an undesirable way (heating, diffusion, absorption, unwanted modification).

Figures 1, 3B:
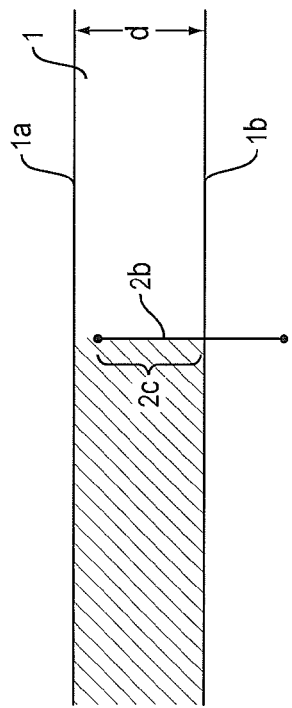
Figures 2, 3B:
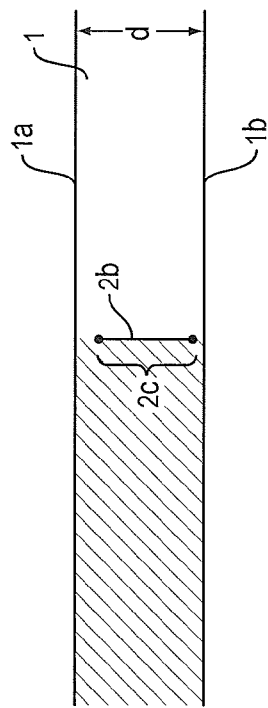
Figures 3, 3B:
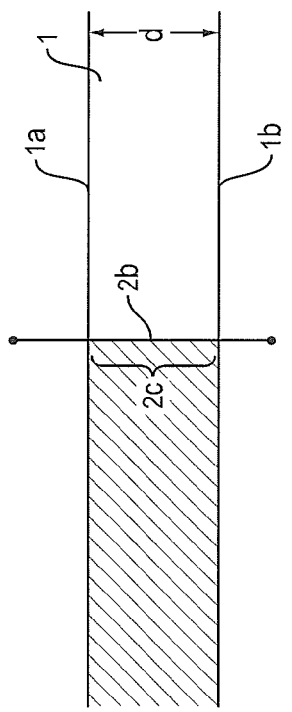
Figures 3, 3B, 4:
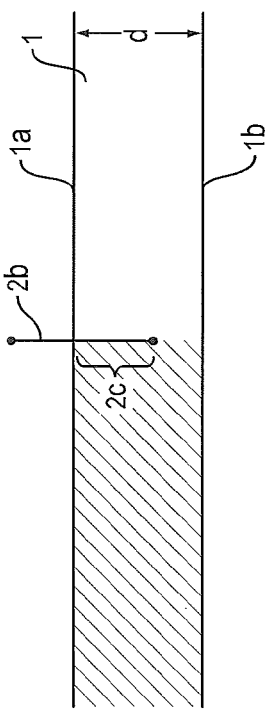

FIG. 3B-1-4 show (not only for the optical assembly in FIG. 3A, but basically also for any other applicable optical assembly 6) that the laser beam focal line 2b can be positioned differently by suitably positioning and/or aligning the optical assembly 6 relative to substrate 1 as well as by suitably selecting the parameters of the optical assembly 6: As FIG. 3B-1 outlines, the length l of the focal line 2b can be adjusted in such a way that it exceeds the substrate thickness d (here by factor 2). The laser beam focal line 2b can have a length l in a range of between about 0.1 mm and about 100 mm or in a range of between about 0.1 mm and about 10 mm, for example. Various embodiments can be configured to have length l of about 0.1 mm, 0.2 mm, 0.3 mm, 0.4 mm, 0.5 mm, 0.7 mm, 1 mm, 2 mm, 3 mm or 5 mm, for example. If substrate 1 is placed (viewed in longitudinal beam direction) centrally to focal line 2b, an extensive section of induced absorption 2c is generated over the entire substrate thickness.

In the case shown in FIG. 3B-2, a focal line 2b of length l is generated which corresponds more or less to the substrate extension d. As substrate 1 relative to line 2 is positioned in such a way that line 2b starts in a point before, i.e. outside the substrate, the length L of the extensive section of induced absorption 2c (which extends here from the substrate surface to a defined substrate depth, but not to the reverse surface 1b) is smaller than the length l of focal line 2b. FIG. 3B-3 shows the case in which the substrate 1 (viewed along the beam direction) is partially positioned before the starting point of focal line 2b so that, here too, it applies to the length l of line 2b l>L (L=extension of the section of induced absorption 2c in substrate 1). The focal line thus starts within the substrate and extends over the reverse surface 1b to beyond the substrate. FIG. 3B-4 finally shows the case in which the generated focal line length l is smaller than the substrate thickness d so that—in case of a central positioning of the substrate relative to the focal line viewed in the direction of incidence—the focal line starts near the surface 1a within the substrate and ends near the surface 1b within the substrate (l=0.75·d).

It is particularly advantageous to realize the focal line positioning in such a way that at least one surface 1a, 1b is covered by the focal line, i.e. that the section of induced absorption 2c starts at least on one surface. In this way it is possible to achieve virtually ideal cuts avoiding ablation, feathering and particulation at the surface.

FIG. 4 depicts another applicable optical assembly 6. The basic construction follows the one described in FIG. 3A so that only the differences are described below. The depicted optical assembly is based the use of optics with a non-spherical free surface in order to generate the focal line 2b, which is shaped in such a way that a focal line of defined length l is formed. For this purpose, aspheres can be used as optic elements of the optical assembly 6. In FIG. 4, for example, a so-called conical prism, also often referred to as axicon, is used. An axicon is a special, conically cut lens which forms a spot source on a line along the optical axis (or transforms a laser beam into a ring). The layout of such an axicon is generally known to one of skill in the art; the cone angle in the example is 10°. The apex of the axicon labeled here with reference 9 is directed towards the incidence direction and centered on the beam center. As the focal line 2b of the axicon 9 already starts in its interior, substrate 1 (here aligned perpendicularly to the main beam axis) can be positioned in the beam path directly behind axicon 9. As FIG. 4 shows, it is also possible to shift substrate 1 along the beam direction due to the optical characteristics of the axicon without leaving the range of focal line 2b. The extensive section of the induced absorption 2c in the material of substrate 1 therefore extends over the entire substrate depth d.

However, the depicted layout is subject to the following restrictions: As the focal line of axicon 9 already starts within the lens, a significant part of the laser energy is not focused into part 2c of focal line 2b, which is located within the material, in case of a finite distance between lens and material. Furthermore, length l of focal line 2b is related to the beam diameter for the available refraction indices and cone angles of axicon 9, which is why, in case of relatively thin materials (several millimeters), the total focal line is too long, having the effect that the laser energy is again not specifically focused into the material.

Figure 5A:
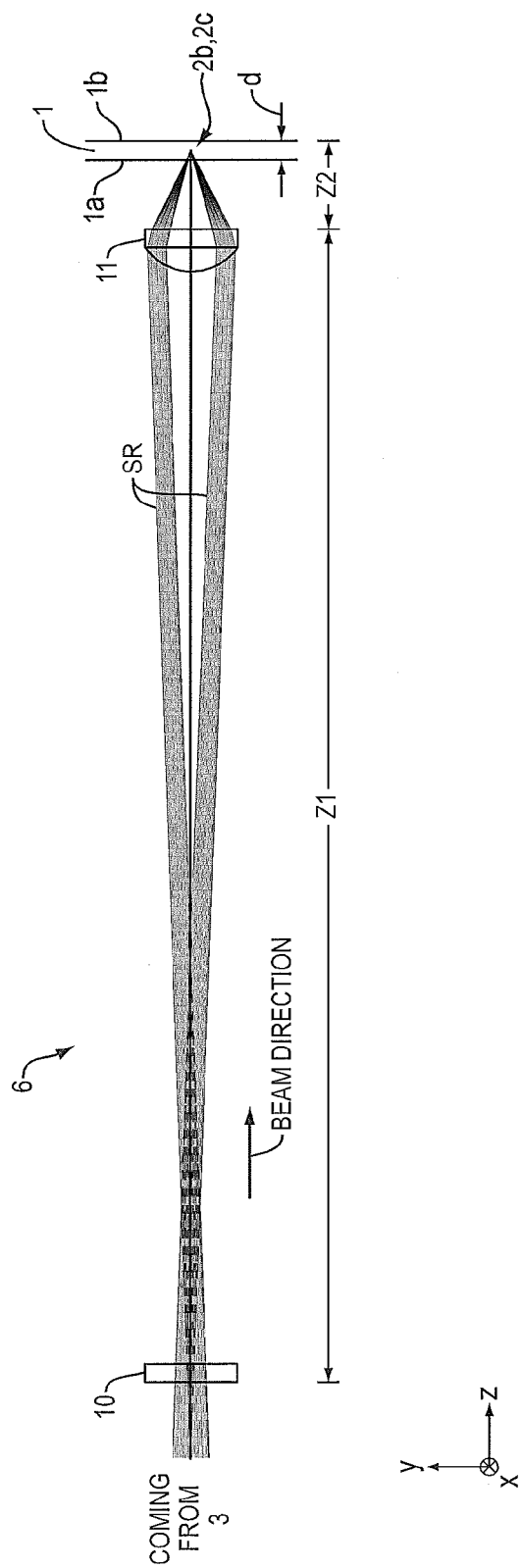

This is the reason for an enhanced optical assembly 6 which comprises both an axicon and a focusing lens. FIG. 5A depicts such an optical assembly 6 in which a first optical element (viewed along the beam direction) with a non-spherical free surface designed to form an extensive laser beam focal line 2b is positioned in the beam path of laser 3. In the case shown in FIG. 5A, this first optical element is an axicon 10 with a cone angle of 5°, which is positioned perpendicularly to the beam direction and centered on laser beam 3. The apex of the axicon is oriented towards the beam direction. A second, focusing optical element, here the plano-convex lens 11 (the curvature of which is oriented towards the axicon), is positioned in beam direction at a distance z1 from the axicon 10. The distance z1, in this case approximately 300 mm, is selected in such a way that the laser radiation formed by axicon 10 circularly is incident on the marginal area of lens 11. Lens 11 focuses the circular radiation on the output side at a distance z2, in this case approximately 20 mm from lens 11, on a focal line 2b of a defined length, in this case 1.5 mm. The effective focal length of lens 11 is 25 mm here. The circular transformation of the laser beam by axicon 10 is labeled with the reference SR.

FIG. 5B depicts the formation of the focal line 2b or the induced absorption 2c in the material of substrate 1 according to FIG. 5A in detail. The optical characteristics of both elements 10, 11 as well as the positioning of them is selected in such a way that the extension 1 of the focal line 2b in beam direction is exactly identical with the thickness d of substrate 1. Consequently, an exact positioning of substrate 1 along the beam direction is required in order to position the focal line 2b exactly between the two surfaces 1a and 1b of substrate 1, as shown in FIG. 5B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly on a required zone, which, on the one hand, serves to realize the required numerical aperture and thus the required spot size, on the other hand, however, the circle of diffusion diminishes in intensity after the required focal line 2b over a very short distance in the center of the spot, as a basically circular spot is formed. In this way, the crack formation is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of a focal point in the focal plane. The length 1 of focal line 2b can be adjusted via the beam diameter on the axicon. The numerical aperture along the focal line, on the other hand, can be adjusted via the distance z1 axicon-lens and via the cone angle of the axicon. In this way, the entire laser energy can be concentrated in the focal line.

If the crack (i.e., defect line) formation is supposed to continue to the emergence side of the substrate, the circular illumination still has the advantage that, on the one hand, the laser power is used in the best possible way as a large part of the laser light remains concentrated in the required length of the focal line, on the other hand, it is possible to achieve a uniform spot size along the focal line—and thus a uniform separation process along the focal line—due to the circularly illuminated zone in conjunction with the desired aberration set by means of the other optical functions. The defect lines 120 extend, for example, through the thickness of the glass sheet, and in the exemplary embodiments described herein are orthogonal to the major (flat) surfaces of the glass sheet.

Instead of the plano-convex lens depicted in FIG. 5A, it is also possible to use a focusing meniscus lens or another higher corrected focusing lens (asphere, multi-lens system).

In order to generate very short focal lines 2b using the combination of an axicon and a lens depicted in FIG. 5A, it would be necessary to select a very small beam diameter of the laser beam inciding on the axicon. This has the practical disadvantage that the centering of the beam onto the apex of the axicon must be very precise and that therefore the result is very sensitive to direction variations of the laser (beam drift stability). Furthermore, a tightly collimated laser beam is very divergent, i.e. due to the light deflection the beam bundle becomes blurred over short distances.

Figure 6:
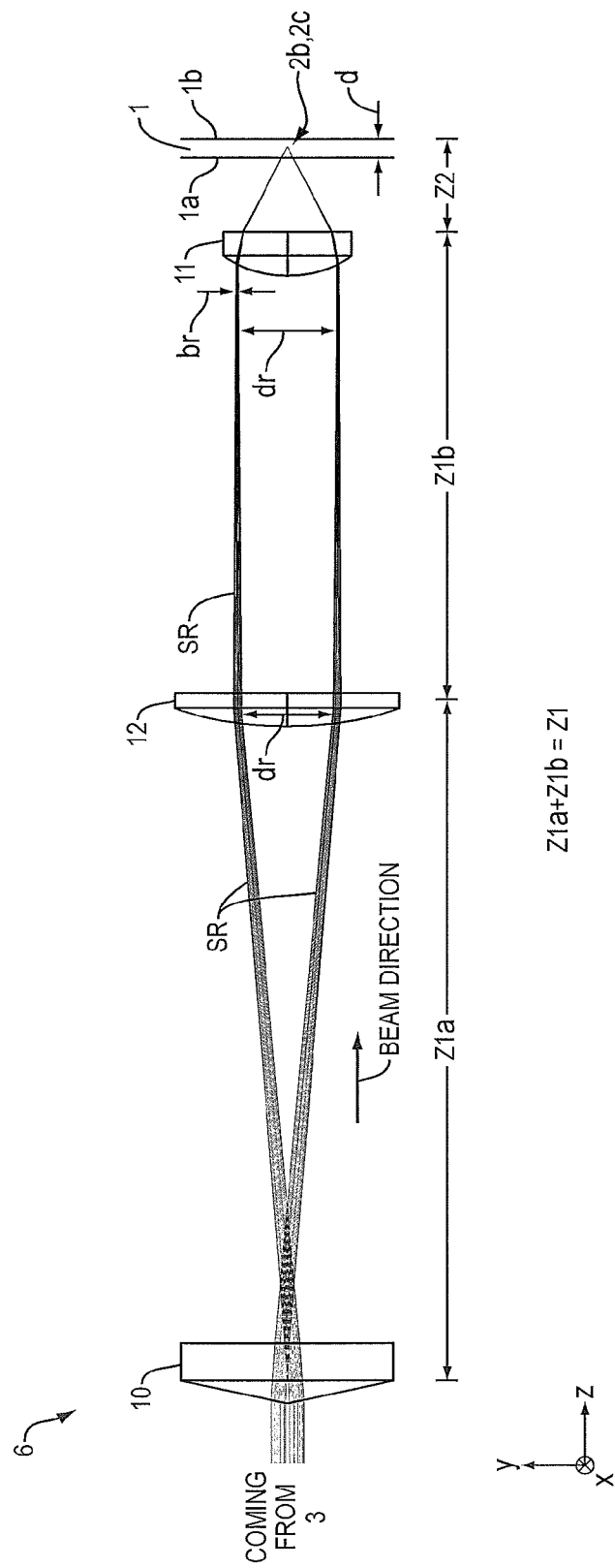
FIG. 6 is a schematic illustration of a fourth optical assembly for laser drilling according to some embodiments.

As shown in FIG. 6, both effects can be avoided by inserting another lens, a collimating lens 12: this further, positive lens 12 serves to adjust the circular illumination of focusing lens 11 very tightly. The focal length f of collimating lens 12 is selected in such a way that the desired circle diameter dr results from distance z1a from the axicon to the collimating lens 12, which is equal to f. The desired width br of the ring can be adjusted via the distance z1b (collimating lens 12 to focusing lens 11). As a matter of pure geometry, the small width of the circular illumination leads to a short focal line. A minimum can be achieved at distance f.

The optical assembly 6 depicted in FIG. 6 is thus based on the one depicted in FIG. 5A so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as z1a, the distance of focusing lens 11 from collimating lens 12 as z1b, and the distance of the generated focal line 2b from the focusing lens 11 as z2 (always viewed in beam direction). As shown in FIG. 6, the circular radiation SR formed by axicon 10, which is incident divergently and under the circle diameter dr on the collimating lens 12, is adjusted to the required circle width br along the distance z1b for an at least approximately constant circle diameter dr at the focusing lens 11. In the case shown, a very short focal line 2b is supposed to be generated so that the circle width br of approximately 4 mm at lens 12 is reduced to approximately 0.5 mm at lens 11 due to the focusing properties of lens 12 (circle diameter dr is 22 mm in the example).

In the depicted example it is possible to achieve a length of the focal line 1 of less than 0.5 mm using a typical laser beam diameter of 2 mm, a focusing lens 11 with a focal length f=25 mm, and a collimating lens with a focal length f=150 mm, and choosing Z1a=Z1b=140 mm and Z2=15 mm.

Figure 7C:
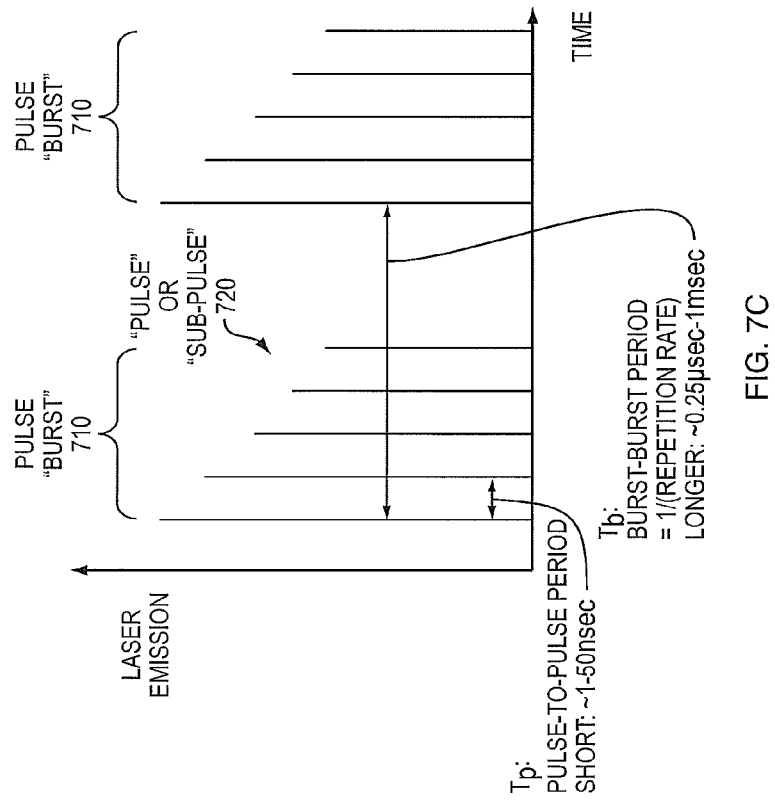
FIG. 7C illustrates schematically relative intensity of laser pulses vs. time within an exemplary pulse burst, with each exemplary pulse burst containing 5 pulses.
Figure 7B:
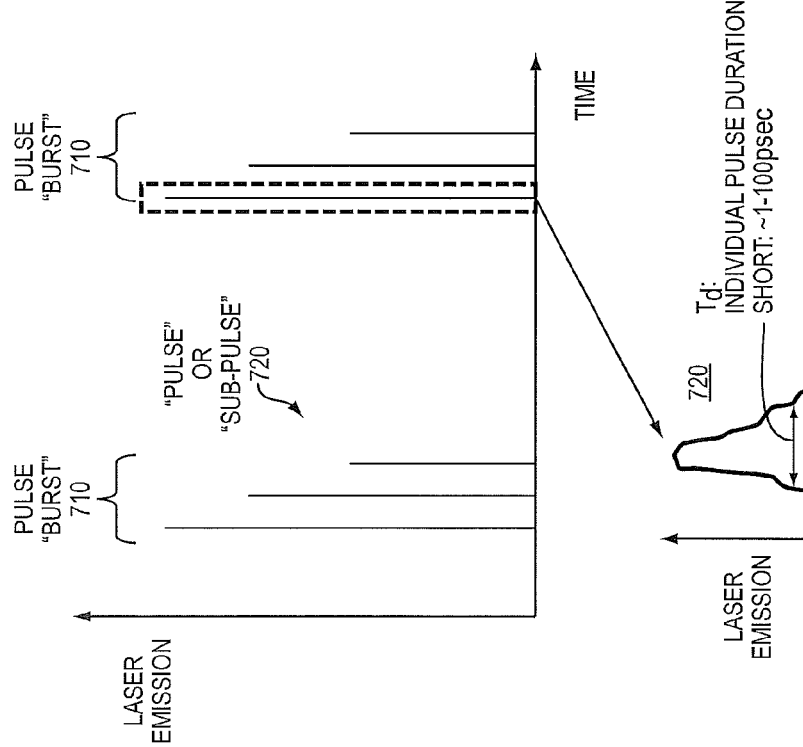
FIG. 7B illustrates schematically the relative intensity of laser pulses within an exemplary pulse burst vs. time, with each exemplary pulse burst having 3 pulses.

Note that, as shown in FIGS. 7A-7C, according to at least some embodiments, the typical operation of such a picosecond laser creates a "burst" 710 of pulses 720 (also referred to as a pulse burst herein). Each "burst" 710 may contain multiple pulses 720 (such as at least 2 pulses, at least 3 pulses as shown in FIGS. 7A-7B, at least 4 pulses, at least 5 pulses as shown in FIG. 7C, at least 10 pulses, at least 15 pulses, at least 20 pulses, or more) of very short duration (e.g., ~10 psec). Each pulse 720 within a burst is separated from an adjacent pulse in time by a duration in a range of between about 1 nsec and about 50 nsec, such as approximately 20 nsec (50 MHz), with the time often governed by the laser cavity design. The time between each "burst" 710 will be much longer, often about 10 μsec, for a laser burst repetition rate of about 100 kHz. That is, a pulse burst is a "pocket" of pulses, and the bursts are separated from one another by a longer duration than the separation of individual adjacent pulses within each burst. The exact timings, pulse durations, and burst repetition rates can vary depending on the laser design, but short pulses (i.e., less than about 15 psec) of high intensity have been shown to work well with this technique.

More specifically, in these embodiments pulses 720 typically have pulse duration $T_d$ of up to 100 psec (for example, 0.1 psec, 5 psec, 10 psec, 15 psec, 18 psec, 20 psec, 22 psec, 25 psec, 30 psec, 50 psec, 75 psec, or therebetween). The energy or intensity of each individual pulse 720 within the burst may not be equal to that of other pulses within the burst, and the intensity distribution of the multiple pulses within a burst 710 often follows an exponential decay in time governed by the laser design. Preferably, each pulse 720 within the burst 710 of the exemplary embodiments described herein are separated in time from the subsequent pulse in the burst by a duration $T_p$ from 1 nsec to 50 nsec (e.g. 10-50 nsec, or 10-30 nsec, with the time often governed by the laser cavity design). For a given laser, the time separation $T_p$ between adjacent pulses (pulse-to-pulse separation) within a burst 710 is relatively uniform (AO %). For example, in some embodiments, each pulse within a burst is separated in time from the subsequent pulse by approximately 20 nsec (50 MHz). For example, for a laser that produces pulse separation $T_p$ of about 20 nsec, the pulse to pulse separation $T_p$ within a burst is maintained within about ±10%, or is about ±2 nsec. The time between each "burst" of pulses (i.e., time separation $T_b$ between bursts) will be much longer (e.g., $0.25 \leq T_b \leq 1000$ microseconds, for example 1-10 microseconds, or 3-8 microseconds). In some of the exemplary embodiments of the laser described herein the time separation $T_b$ is around 5 microseconds for a laser with burst repetition rate or frequency of about 200 kHz. The laser burst repetition rate is defined as the time between the first pulse in a burst to the first pulse in the subsequent burst. In some embodiments, the burst repetition frequency may be in a range of between about 1 kHz and about 4 MHz. More preferably, the laser burst repetition rates can be, for example, in a range of between about 10 kHz and 650 kHz. The time $T_b$ between the first pulse in each burst to the first pulse in the subsequent burst may be 0.25 microsecond (4 MHz burst repetition rate) to 1000 microseconds (1 kHz burst repetition rate), for example 0.5 microseconds (2 MHz burst repetition rate) to 40 microseconds (25 kHz burst repetition rate), or 2 microseconds (500 kHz burst repetition rate) to 20 microseconds (50 k Hz burst repetition rate). The exact timings, pulse durations, and burst repetition rates can vary depending on the laser design, but short pulses ($T_d \leq 20$ psec and preferably $T_d \leq 15$ psec) of high intensity have been shown to work particularly well.

The required energy to modify the material can be described in terms of the burst energy—the energy contained within a burst (each burst 710 contains a series of pulses 720), or in terms of the energy contained within a single laser pulse (many of which may comprise a burst). For these applications, the energy per burst can be from 25-750 µJ, more preferably 50-500 µJ, or 50-250 µJ In some embodiments the energy per burst is 100-250 µJ. The energy of an individual pulse within the pulse burst will be less, and the exact individual laser pulse energy will depend on the number of pulses 720 within the pulse burst 710 and the rate of decay (e.g., exponential decay rate) of the laser pulses with time as shown in FIGS. 7B and 7C. For example, for a constant energy/burst, if a pulse burst contains 10 individual laser pulses 720, then each individual laser pulse 720 will contain less energy than if the same pulse burst 710 had only 2 individual laser pulses.

The use of laser capable of generating such pulse bursts is advantageous for cutting or modifying transparent materials, for example glass. In contrast with the use of single pulses spaced apart in time by the repetition rate of the single-pulsed laser, the use of a pulse burst sequence that spreads the laser energy over a rapid sequence of pulses within the burst 710 allows access to larger timescales of high intensity interaction with the material than is possible with single-pulse lasers. While a single-pulse can be expanded in time, as this is done the intensity within the pulse must drop as roughly one over the pulse width. Hence if a 10 psec single pulse is expanded to a 10 nsec pulse, the intensity drops by roughly three orders of magnitude. Such a reduction can reduce the optical intensity to the point where non-linear absorption is no longer significant, and light material interaction is no longer strong enough to allow for cutting. In contrast, with a pulse burst laser, the intensity during each pulse 720 within the burst 710 can remain very high—for example three 10 psec pulses 720 spaced apart in time by approximately 10 nsec still allows the intensity within each pulse to be approximately three times higher than that of a single 10 psec pulse, while the laser is allowed to interact with the material over a timescale that is now three orders of magnitude larger. This adjustment of multiple pulses 720 within a burst thus allows manipulation of time-scale of the laser-material interaction in ways that can facilitate greater or lesser light interaction with a pre-existing plasma plume, greater or lesser light-material interaction with atoms and molecules that have been pre-excited by an initial or previous laser pulse, and greater or lesser heating effects within the material that can promote the controlled growth of microcracks. The required amount of burst energy to modify the material will depend on the substrate material composition and the length of the line focus used to interact with the substrate. The longer the interaction region, the more the energy is spread out, and higher burst energy will be required. The exact timings, pulse durations, and burst repetition rates can vary depending on the laser design, but short pulses ($\leq 15$ psec, or $\leq 10$ psec) of high intensity have been shown to work well with this technique. The defect line or a hole is formed in the material when a single burst of laser pulses strikes essentially the same location on the glass. That is, multiple laser pulses within a single burst correspond to a single defect line or a hole location in the glass. Of course, since the glass is translated (for example by a constantly moving stage) (or the beam is moved relative to the glass, the individual pulses within the burst cannot be at exactly the same spatial location on the glass. However, they are well within 1 µm of one another—i.e., they strike the glass at essentially the same location. For example, they may strike the glass at a spacing sp where $0 < sp \leq 500$ nm from one another. For example, when a glass location is hit with a burst of 20 pulses the individual pulses within the burst strike the glass within 250 nm of each other. Thus, in some embodiments 1 nm<sp<250 nm. In some embodiments 1 nm<sp<100 nm.

The laser beam has a wavelength less than or equal to about 850 nm, the wavelength selected such that the material is substantially transparent (i.e., absorption less than about 10%, preferably less than about 1% per mm of material depth) at this wavelength, the laser beam having an average laser energy measured at the material greater than about 50 µJ per mm of material thickness, and pulses having a duration in a range of between greater than about 1 picosecond and less than about 100 picoseconds, and a pulse burst repetition rate in a range of between about 1 kHz and about 2 MHz. The method then includes directing the laser beam focal line into the material, the laser beam focal line generating an induced absorption within the material, the induced absorption producing a defect line along the laser beam focal line within the material, and producing subsurface damage up to a depth less than or equal to 100 µm within the material, for example than or equal to about 75 µm within the material, and in some embodiments ≤50 µm, for example, ≤40 µm.

The depth of subsurface damage can be measured by using a confocal microscope to look at the cut surface, the microscope having an optical resolution of a few nm. Surface reflections are ignored while cracks are sought out down into the material, the cracks showing up as bright lines. One then steps into the material until there are no more "sparks", collecting images at regular intervals. The images are then manually processed by looking for cracks and tracing them through the depth of the glass to get a maximum depth (typically measured in microns (µm)) of subsurface damage. There are typically thousands and thousands of cracks, so one typically just tracks the largest ones. One typically repeats this process on about 5 locations of a cut edge. Any cracks that are directly perpendicular to the edge of the glass will not be detected by this method.

In some embodiments, the method further includes translating the material and the laser beam relative to each other, thereby drilling a plurality of defect lines within the material, the defect lines spaced apart so as to separate the material into at least two pieces. For cutting operations, the laser triggering generally is synchronized with the stage driven motion of the material beneath the beam, so laser pulse bursts are triggered at a fixed interval, such as for example every 1 µm, or every 5 µm. The exact spacing between adjacent perforations or defect lines is determined by the material properties that facilitate crack propagation from perforated hole (i.e., defect line) to perforated hole, given the stress level in the substrate. However, in contrast to cutting a substrate, it is also possible to use the same method to only perforate the material, such as for creating holes for conducting electrical signals from one part to another, thereby creating components called interposers. In the case of interposers, the defect lines are generally separated by much greater distance than required for cutting—instead of a pitch of about 10 µm or less, the spacing between defect lines can be hundreds of microns. The exact locations of the defect lines need not be at regular intervals—the location simply is determined by when the laser is triggered to fire, and may be at any location within the part.

The embodiments of the process described herein can cut glass at a cutting speed of 0.25 m/sec, or faster. A cut speed (or cutting speed) is the rate the laser beam moves relative to the surface of the transparent material (e.g., glass) while creating multiple holes or modified regions.) High cut speeds, such as, for example 400 mm/sec, 500 mm/sec, 750 mm/sec, 1 m/sec, 1.2 m/sec, 1.5 m/sec, or 2 m/sec, or even 3 m/sec to 4 m/sec are often desired in order to minimize capital investment for manufacturing, and to optimize equipment utilization rate. The laser power is equal to the burst energy multiplied by the burst repetition frequency (rate) of the laser. In general, to cut such glass materials at high cutting speeds, the damage tracks are typically spaced apart by 1-25 microns, in some embodiments the spacing is preferably 2 microns or larger—for example 2-12 microns, or for example 3-10 microns.

For example, to achieve a linear cutting speed of 300 mm/sec, 3 micron hole pitch corresponds to a pulse burst laser with at least 100 kHz burst repetition rate. For a 600 mm/sec cutting speed, a 3 micron pitch corresponds to a burst-pulsed laser with at least 200 kHz burst repetition rate. A pulse burst laser that produces at least 40 µJ/burst at 200 kHz, and cuts at a 600 mm/s cutting speed needs to have laser power of at least 8 Watts. Higher cut speeds therefore require even higher laser powers.

For example 0.4 msec cut speed at 3 µm pitch and 40 µJ/burst would require at least 5 Watt laser power delivered, a 0.5 msec cut speed at 3 µm pitch and 40 µJ/burst would require at least 6 Watt laser delivered. Thus, preferably the laser power of the pulse burst picosecond laser is 6 watts or higher, more preferably at least 8 Watts or higher, and even more preferably at least 10 W or higher. For example in order to achieve a 0.4 msec cut speed at 4 µm pitch (defect lines pacing, or between damage tracks spacing) and 100 µJ/burst one would require at least a 10 Watt laser, and to achieve a 0.5 msec cut speed at 4 µm pitch and 100 µJ/burst one would require at least a 12 Watt laser. For example, to achieve a cut speed of 1 m/sec at 3 µm pitch and 40 µJ/burst one would require at least a 13 Watt laser. Also for example 1 m/sec cut speed at 4 µm pitch and 400 µJ/burst would require at least a 100 Watt laser. The optimal pitch between damage tracks and the exact burst energy is material dependent, and can be determined empirically. However, it should be noted that raising the laser pulse energy or making the damage tracks at a closer pitch are not conditions that always make the substrate material separate better or with improved edge quality. Too dense a pitch (for example <0.1 micron, in some exemplary embodiments <1 µm, or in some embodiments <2 µm) between damage tracks can sometimes inhibit the formation of nearby subsequent damage tracks, and often can inhibit the separation of the material around the perforated contour, and may also result in increased unwanted micro cracking within the glass. Too long a pitch (>50 µm, and in some glasses >25 µm or even >20 µm) may result in "uncontrolled micro cracking"—i.e., where instead of propagating from hole to hole the microcracks propagate along a different path, and cause the glass to crack in a different (undesirable) direction. This may ultimately lower the strength of the separated glass part, since the residual microcracks will acts as flaws which weaken the glass. Too high a burst energy (e.g., >2500 µJ/burst, and in some embodiments >500 µJ/burst) used to form each damage track can cause "healing" or re-melting of already formed microcracks of adjacent damage tracks, which will inhibit separation of the glass. Accordingly, it is preferred that burst energy be <2500 µJ/burst, for example, ≤500 µJ/burst. Also, using a burst energy that is too high can cause formation of microcracks that are extremely large and create flaws which reduce the edge strength of the parts after separation. Too low a burst energy (<40 µJ/burst) may result in no appreciable damage track formed within the glass, and hence very high separation strength or complete inability to separate along the perforated contour.

Typical exemplary cutting rates (speeds) enabled by this process are, for example, 0.250 msec and higher. In some embodiments the cutting rates are at least 300 mm/sec. In some embodiments described herein the cutting rates are at least 400 mm/sec, for example 500 mm/sec to 2000 mm/sec, or higher. In some embodiments the picosecond laser utilizes pulse bursts to produce defect lines with periodicity between 0.5 microns and 13 microns, e.g. 0.5 and 3 microns. In some embodiments the pulsed laser has laser power of 10 W-100 W and the material and/or the laser beam are translated relative to one another at a rate of at least 0.25 m/sec, for example at the rate of 0.25 to 0.35 msec, or 0.4 msec to 5 msec. Preferably, each pulse burst of the pulsed laser beam has an average laser energy measured at the workpiece greater than 40 microJoules per burst mm thickness of workpiece. Preferably, each pulse burst of the pulsed laser beam has an average laser energy measured at the workpiece greater of less than 2500 microJoules per burst per mm thickness of workpiece, and preferably less than about 2000 microJoules per burst per mm, and in some embodiments less than 1500 microJoules per burst per mm thickness of workpiece, for example not more than 500 microJoules per burst per mm thickness of workpiece Accordingly, it is preferable that the laser produces pulse bursts with at least 2 pulses per burst. For example, in some embodiments the pulsed laser has laser power of 10 W-150 W (e.g., 10-100 W) and produces pulse bursts with at least 2 pulses per burst (e.g., 2 to 25 pulses per burst). In some embodiments the pulsed laser has the power of 25 W to 60 W, and produces pulse bursts with at least 2 to 25 pulses per burst, and the distance or periodicity between the adjacent defect lines produced by the laser bursts is 2-10 microns. In some embodiments the pulsed laser has laser power of 10 W to 100 W, produces pulse bursts with at least 2 pulses per burst, and the workpiece and the laser beam are translated relative to one another at a rate of at least 0.25 m/sec. In some embodiments the workpiece and/or the laser beam are translated relative to one another at a rate of at least 0.4 m/sec For cutting speeds of 0.4 m to 5 m/sec, laser powers should preferably be 10 W-150 W, with burst energy of 40-750 µJ/burst, 2-25 bursts per pulse (depending on the material that is cut), and hole separation (or pitch) of 3 to 15 µm, or 3-10 µm. The use of picosecond pulse burst lasers would be preferable for these cutting speeds because they generate high power and the required number of pulses per burst. Thus, according to some exemplary embodiments, the pulsed laser produces 10-100 W of power, for example 25 W to 60 Watts, and produces pulse bursts at least 2-25 pulses per burst and the distance between the defect lines is 2-15 microns; and the laser beam and/or the workpiece are translated relative to one another at a rate of at least 0.25 m/sec, in some embodiments at least 0.4 m/sec, for example 0.5 m/sec to 5 m/sec, or faster.

EXEMPLIFICATION

Figure 8:
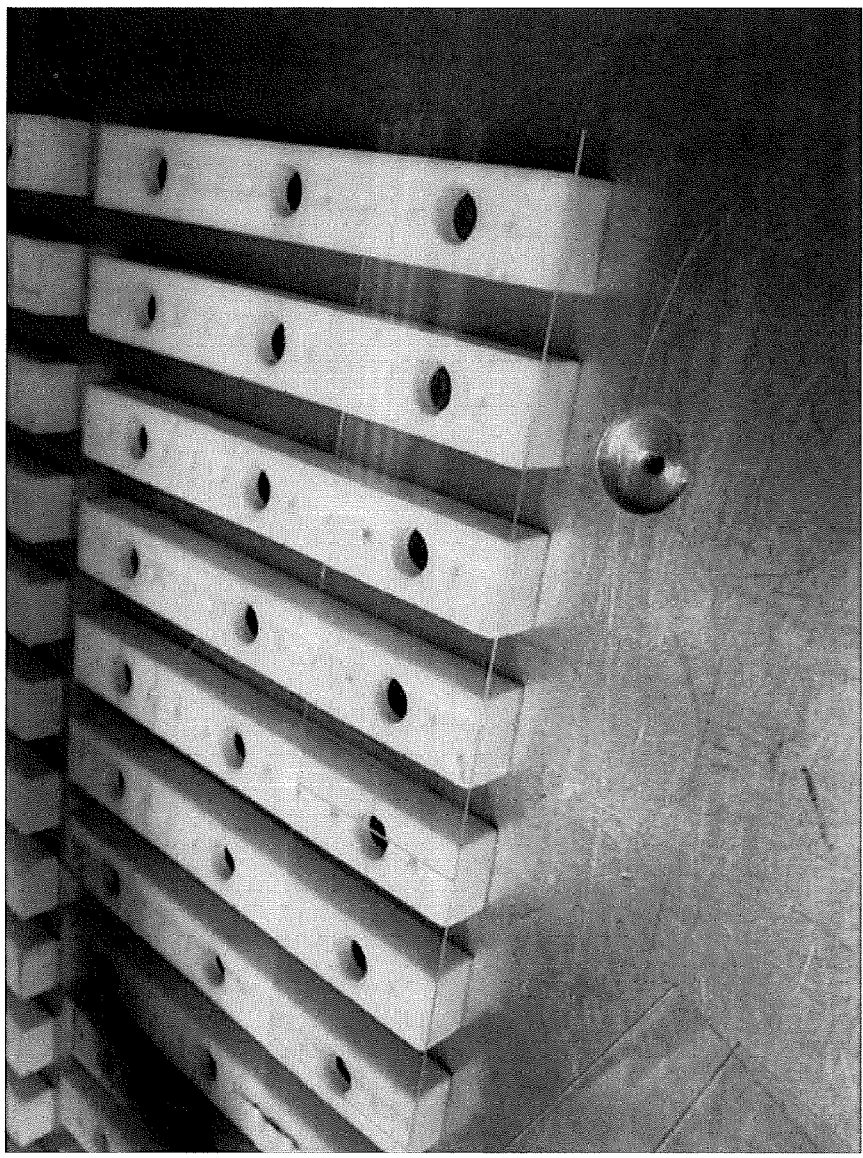
FIG. 8 is a photograph of Corning 2320 Gorilla® glass samples on a vacuum fixture.
Figure 9:
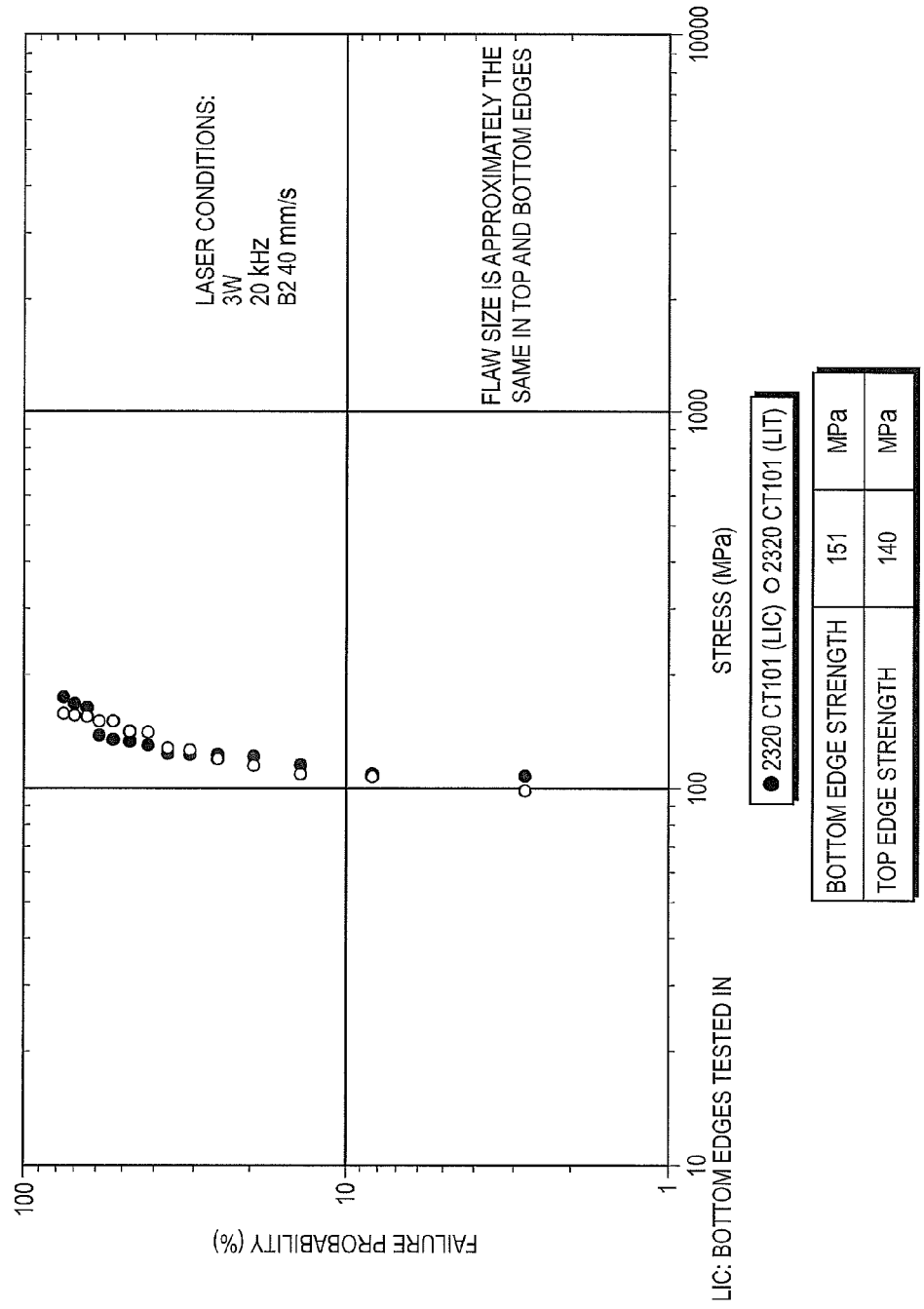
FIG. 9 is a graph of failure probability as a function of stress for Corning 2320 Gorilla® glass showing results of stress tests with laser-in-compression (LIC) and laser-in-tension (LIT).

Samples of Corning 2320 Gorilla® (ion-exchanged, also called "Full Gorilla" (FG)) glass, shown in FIG. 8, were tested for strength, sub-surface damage, and surface roughness. The edge strength of samples cut using the 532 nm process described above is shown in FIG. 9. As shown in Tables 1 and 2 below, samples cut using the 532 nm process had an average subsurface damage of about 23 µm, while samples cut using a 1064 nm process described in U.S. Application No. 61/752,489 filed on Jan. 15, 2013 had an average subsurface damage of about 74 µm.

TABLE 1

RMS roughness and subsurface damage results

SAMPLE 203 - 0.545 mm Full GG 2320

| | RMS (nm) | PV (nm) | SSD µm 1064 nm Results |
|---|---|---|---|
| Spot A | 1061 | 11434 | 69 |
| Spot B | 1220 | 14745 | 77 |
| Spot C | 1164 | 11350 | 68 |
| Spot D | 1165 | 15476 | 78 |
| Spot E | 994 | 10136 | 80 |
| Mean | 1120.8 | 12628.2 | 74.4 |
| Range | 226 | 5340 | 12 |
| Std Dev | 91.3 | 2337.8 | 5.5 |

TABLE 2

Subsurface damage at different burst repetition rates and stage speeds

| Sample ID | Max SSD (µm) | No. of Areas Examined | Each Area Max SSD |
|---|---|---|---|
| 1st Sample | 29 | 6 | 22, 24, 26, 26, 23, 29 |
| 20 KHz - 20 mm/s - Side of Sample | 58 | 1 | 58 |
| 20 KHz - 20 mm/s | 38 | 3 | 28, 38, 32 |
| 20 KHz - 40 mm/s | 28 | 5 | 21, 20, 23, 28, 23 |
| 10 KHz - 30 mm/s | 37 | 5 | 29, 27, 24, 27, 37 |
| 10 KHz - 40 mm/s | 54 | 5 | 54, 38, 35, 33, 31 |

Figure 10:
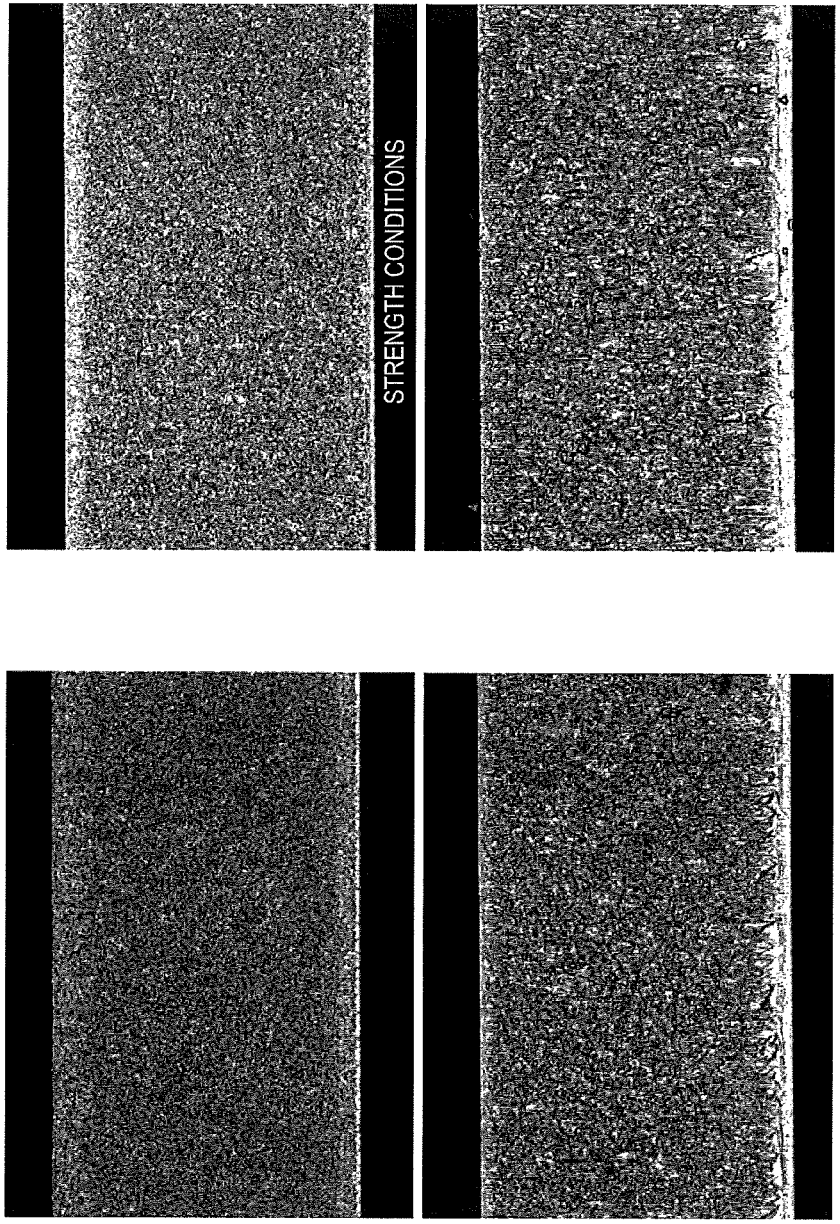
FIG. 10 shows several photographs of various cut surfaces at 20× magnification.
Figures 11A, 11B:
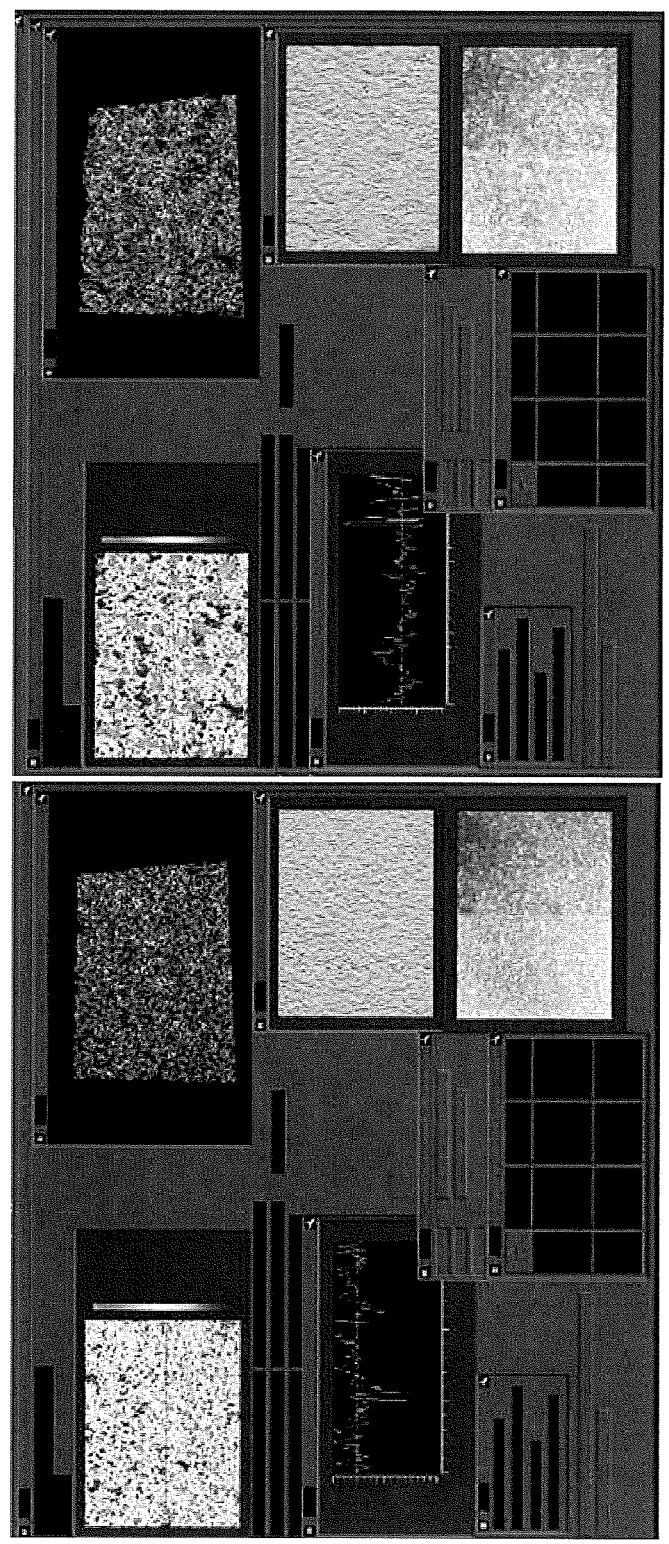
FIGS. 11A-11D are screen shots of representative Zygo scans (total of 5 scans collected for each condition).
Figure 11D:
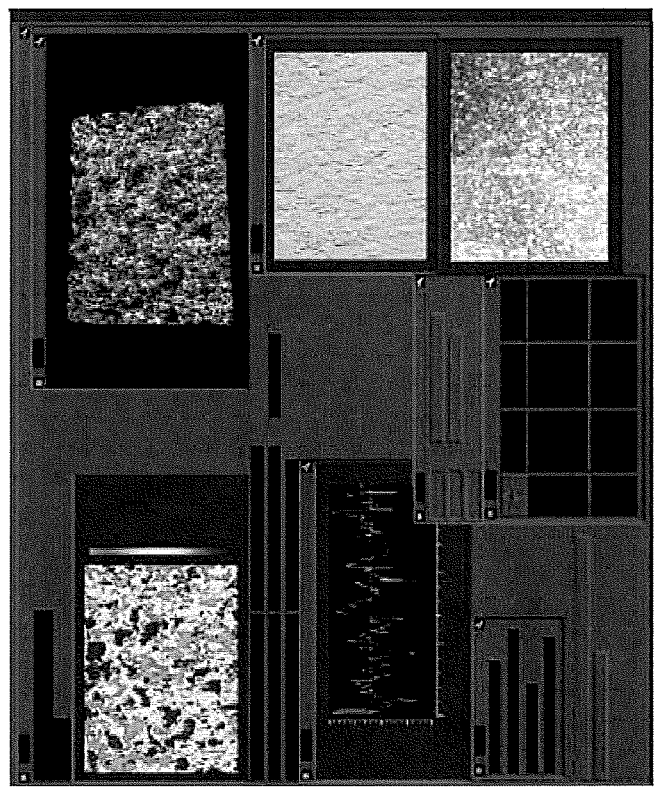
Figure 11C:
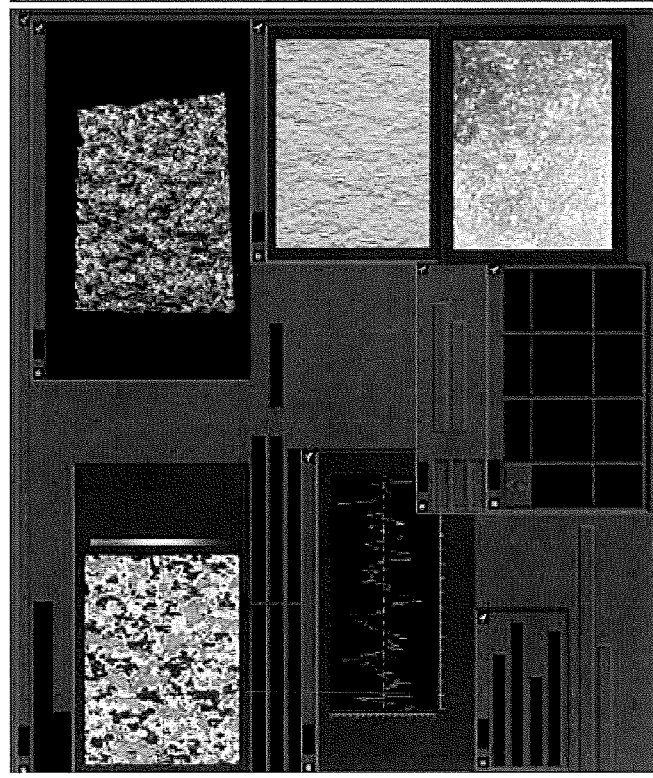

FIG. 10 includes several SEM micrographs of several cut surfaces, showing laser confocal cut surface scans at 20× magnification. Table 3 below shows measurements of surface roughness as a function of pulse spacing, measured with a Zygo optical surface profiler, showing that Ra and RMS surface roughness both appear to increase with pulse spacing. Zygo Corporation, Middlefield, Conn.

TABLE 3

Zygo Surface Roughness vs. Pulse Spacing

| Sample ID Pulse Spacing Varied | Ra (µm) AVG 5 Points | RMS (µm) AVG 5 Points |
|---|---|---|
| 1 | .31 | .4 |
| 2 | .43 | .56 |
| 3 | .54 | .7 |
| 4 | .66 | .83 |

Figures 12A, 12B, 12C:
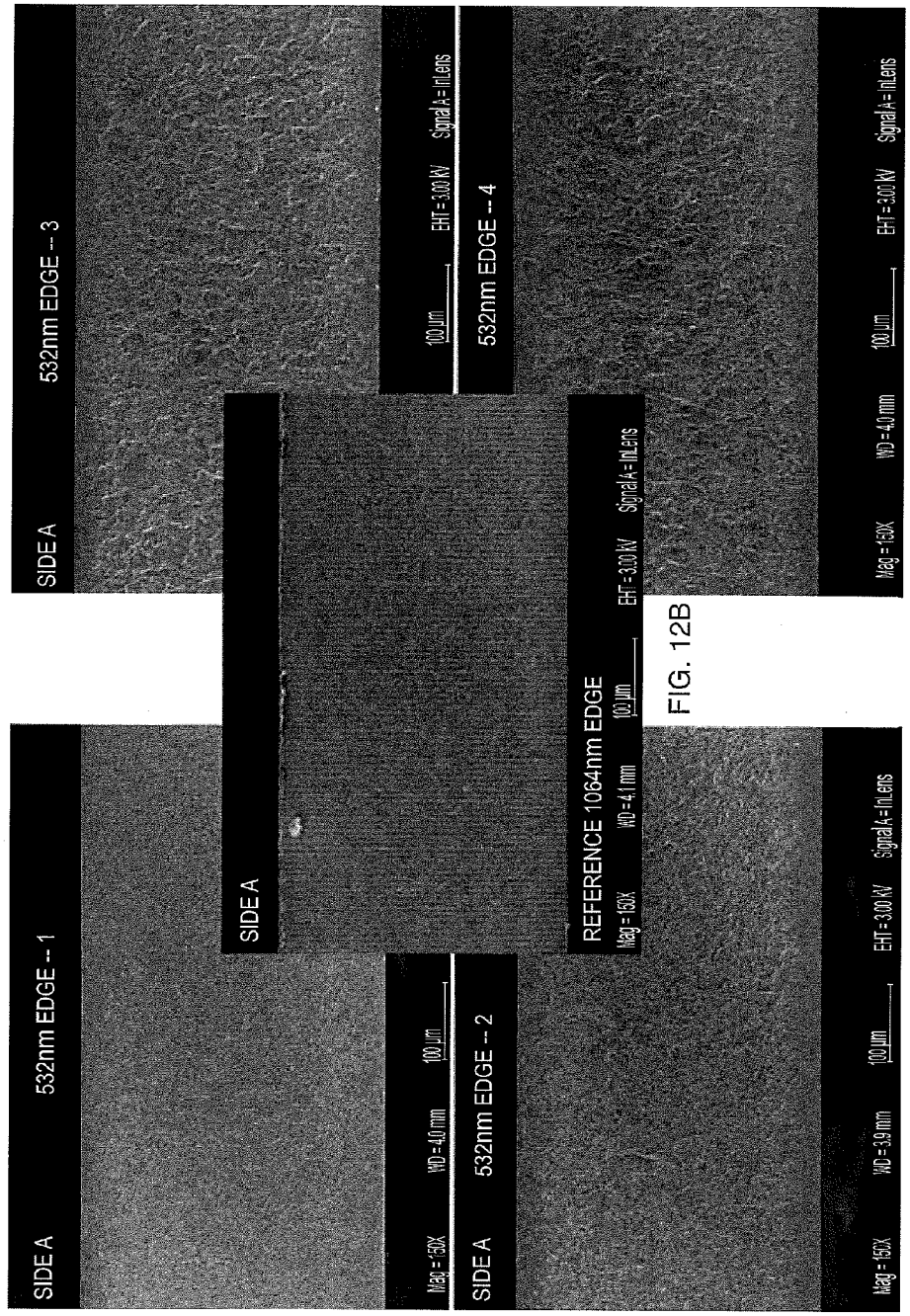
FIGS. 12A-12C are SEM micrographs comparing cross sectional views of edges obtained with the 532 nm process with a cross sectional view of a reference edge obtained with the 1064 nm process (FIG. 12B).
Figure 13B:
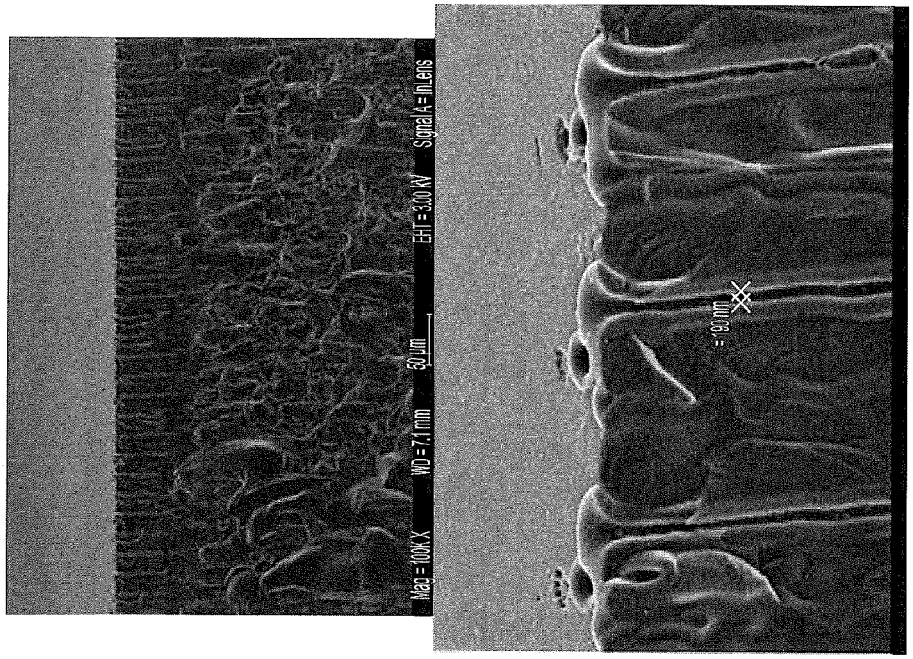
FIGS. 13A-13B are SEM micrographs comparing a reference edge made with the 1064 nm process (FIG. 13A) with an edge made with the 532 nm process (FIG. 13B).
Figure 13A:
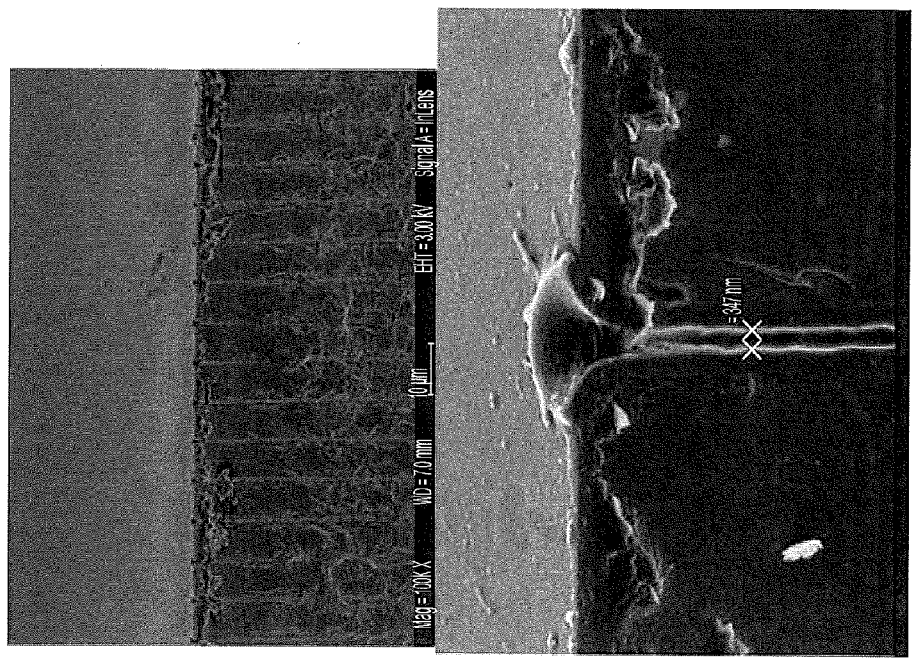

Zygo representative scans are shown in FIGS. 11A-11D. FIGS. 12A-12C show photographs of edges of samples cut using the 532 nm process (FIGS. 12A and 12C) and a reference edge of a sample cut using the 1064 nm process. FIG. 13A shows a higher magnification photograph of features made with the 1064 nm process, where the diameter of the hole was measured at 347 nm, as compared to the diameter of a hole made with the 532 nm process (FIG. 13B) that was 190 nm.

Table 4 below shows a comparison of the RMS surface roughness and subsurface damage (SSD) between samples cut using the 1064 nm process and samples cut using the 532 nm described above.

TABLE 4

1064 nm v. 532 nm Direct Comparison

| | 1064 nm RMS (nm)[1] | 532 nm RMS (nm)[2] | 1064 nm SSD (µm)[1] | 532 nm SSD(µm)[2] |
|---|---|---|---|---|
| Avg | 1120.8 | 556 | 74.4 | 23 |
| Range | 226 | 20 | 12 | 8 |
| Std Dev | 91.3 | 9 | 5.5 | 3 |

Notes:
[1]0.55 mm 2320 FG glass
[2]0.40 mm 2320 FG glass (2 µm spacing cut - strength sample)

Figure 14B:
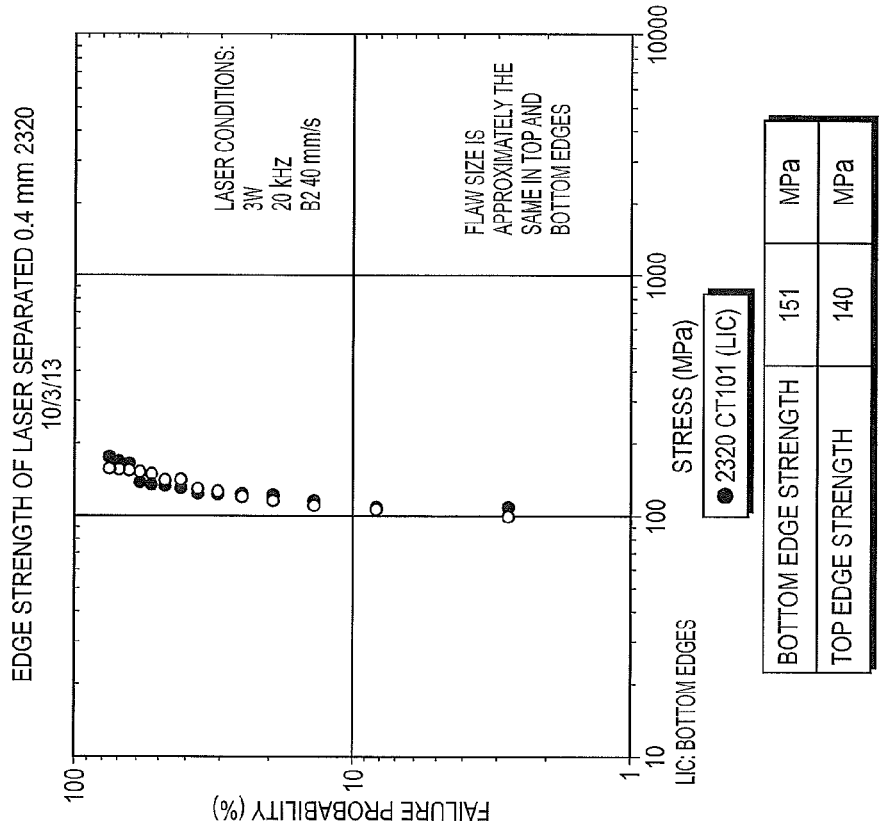
FIGS. 14A-14B are graphs of failure probability as a function of stress for Corning 2320 Gorilla® glass showing results of stress tests with laser-in-compression (LIC) and laser-in-tension (LIT) for edges separated with the 1064 nm process (FIG. 14A) and for edges separated with the 532 nm process (FIG. 14B).
Figure 14A:
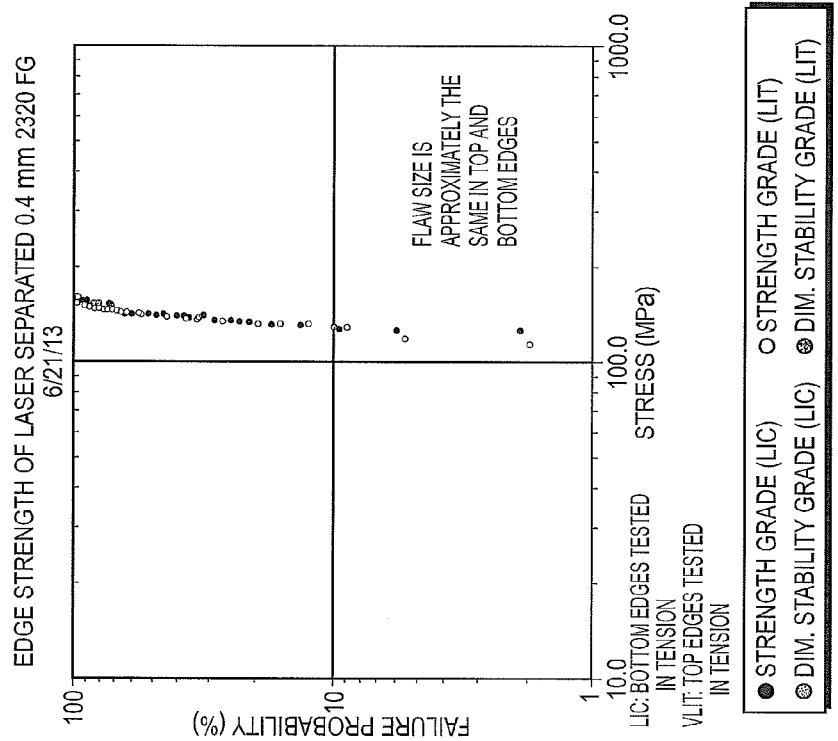

FIGS. 14A and 14B show a comparison of edge strength of samples cut using the 1064 nm process (FIG. 14A) and the 532 nm process (FIG. 14B), showing that the edge strengths of the samples produced by the two processes are relatively similar.

The relevant teachings of all patents, published applications and references cited herein are incorporated by reference in their entirety.

While exemplary embodiments have been disclosed herein, it will be understood by those skilled in the art that various changes in form and details may be made therein without departing from the scope encompassed by the appended claims.

What is claimed is:

1. A method of laser drilling a material comprising:
focusing a pulsed laser beam into a laser beam focal line oriented along a beam propagation direction, the laser beam having a wavelength less than or equal to about 850 nm, the laser beam focal line having a length extending along the beam propagation direction that is in a range of between about 0.1 mm and about 100 mm and an average spot diameter that is in a range of between about 0.1 µm and about 5 µm; and
directing the laser beam focal line into the material, the laser beam focal line generating an induced absorption within the material, the induced absorption producing a defect line having a diameter less than or equal to about 300 nm along the laser beam focal line within the material.

2. The method of claim 1, wherein the laser beam has a wavelength less than or equal to about 775 nm.

3. The method of claim 2, wherein the laser beam has a wavelength less than or equal to about 600 nm.

4. The method of claim 3, wherein the laser beam has a wavelength less than or equal to about 532 nm.

5. The method of claim 1, wherein the pulsed laser produces pulse bursts with at least 2 pulses per pulse burst.

6. The method of claim 1, wherein the pulsed laser has laser power of 10 W-150 W and produces pulse bursts with at least 2 pulses per pulse burst.

7. The method of claim 6, wherein the pulsed laser has laser power of 10 W-100 W and produces pulse bursts with 2-25 pulses per pulse burst.

8. The method of claim 6, further comprising:
translating the laser beam focal line and the material relative to each other such that an adjacent defect line is produced within the material, wherein the pulsed laser that produces the defect line and the adjacent defect line has laser power of 25 W-60 W, and produces pulse bursts with 2-25 pulses per burst, wherein a distance between the defect line and the adjacent defect line is 0.5-10 microns.

9. The method of claim 6, wherein the pulsed laser has laser power of 10 W-100 W and the workpiece or the laser beam is translated relative to one another at a rate of at least 0.25 msec.

10. The method of claim 6, wherein (i) the pulsed laser has laser power of 10 W-100 W; and (ii) the workpiece and the laser beam are translated relative to one another at a rate of at least 0.4 msec.

11. The method of claim 1, wherein the induced absorption produces subsurface damage up to a depth less than or equal to about 75 µm within the material.

12. The method of claim 1, wherein the induced absorption produces subsurface damage up to a depth less than or equal to about 40 µm within the material.

13. The method of claim 1, wherein the induced absorption produces an Ra surface roughness less than or equal to about 0.5 µm.

14. The method of claim 1, further including translating the material and the laser beam relative to each other, thereby drilling a plurality of defect lines within the material, the defect lines spaced apart so as to separate the material into at least two pieces.

15. The method of claim 1, wherein the pulse duration is in a range of between greater than about 1 picosecond and less than about 100 picoseconds.

16. The method of claim 15, wherein the pulse duration is in a range of between greater than about 5 picoseconds and less than about 20 picoseconds.

17. The method of claim 1, wherein the pulsed laser beam has a burst repetition rate in a range of between about 1 kHz and 2 MHz.

18. The method of claim 17, wherein the pulsed laser beam has a burst repetition rate in a range of between about 10 kHz and 650 kHz.

19. The method of claim 1, wherein the pulsed laser beam has an average laser power per burst measured at the material greater than 40 µJ per burst.

20. The method of claim 1, wherein the pulsed laser is configured to emit pulses produced in bursts of at least two pulses separated by a duration in a range of between about 1 nsec and about 50 nsec, and the burst repetition frequency is in a range of between about 1 kHz and about 2 MHz.

21. The method of claim 20, wherein the pulses are separated by a duration of about 20 nsec.

22. The method of claim 1, wherein the length of the laser beam focal line is in a range of between about 0.1 mm and about 8 mm.

23. The method of claim 1, further comprising:
directing the pulsed laser beam to form a ring of laser radiation on a marginal area of a focusing optic element; and
focusing the ring of laser radiation with the focusing optic element into the laser beam focal line.

24. The method of claim 23, further comprising:
directing the pulsed laser beam onto a circular aperture such that central beam bundles of the laser beam are absorbed by the aperture and marginal beam bundles of the laser beam pass around the aperture and form the ring of laser radiation on the marginal area of the focusing optic element.

25. The method of claim 23, further comprising:
directing the pulsed laser beam through an axicon to form the ring of laser radiation on the marginal area of the focusing optic element.

26. The method of claim 25, further comprising:
collimating the pulsed laser beam with a collimating lens positioned between the axicon and the focusing optic element.

27. A method of laser drilling a material comprising:
focusing a pulsed laser beam into a laser beam focal line oriented along a beam propagation direction, the laser beam having a wavelength less than 850 nm, the laser beam focal line having a length extending along the beam propagation direction that is in a range of between about 0.1 mm and about 100 mm and an average spot diameter that is in a range of between about 0.1 µm and about 5 µm; and
directing the laser beam focal line into the material, the laser beam focal line generating an induced absorption within the material, the induced absorption producing a defect line having an internal diameter less than 0.5 µm along the laser beam focal line within the material.

28. The method of claim 27, wherein producing the defect line includes producing the defect line with internal diameter of less than 0.4 µm.

29. The method of claim 28, wherein producing the defect line includes producing the defect line with internal diameter of less than 0.3 µm.

30. The method of claim 29, wherein producing the defect line includes producing the defect line with internal diameter of less than 0.2 µm.

31. The method of claim 27, further comprising:
directing the pulsed laser beam to form a ring of laser radiation on a marginal area of a focusing optic element; and
focusing the ring of laser radiation with the focusing optic element into the laser beam focal line.

32. The method of claim 31, further comprising:
directing the pulsed laser beam onto a circular aperture such that central beam bundles of the laser beam are absorbed by the aperture and marginal beam bundles of the laser beam pass around the aperture and form the ring of laser radiation on the marginal area of the focusing optic element.

33. The method of claim 31, further comprising:
directing the pulsed laser beam through an axicon to form the ring of laser radiation on the marginal area of the focusing optic element.

34. The method of claim 33, further comprising:
collimating the pulsed laser beam with a collimating lens positioned between the axicon and the focusing optic element.

35. A method of laser drilling a material comprising:
directing a pulsed laser beam to form a ring of laser radiation on a marginal area of a focusing optic element, the laser beam having a wavelength less than 850 nm;
focusing the ring of laser radiation with the focusing optic element into a laser beam focal line oriented along a beam propagation direction; and
directing the laser beam focal line into the material, the laser beam focal line generating an induced absorption within the material, the induced absorption producing a defect line having an internal diameter less than 0.5 µm along the laser beam focal line within the material.

36. The method of claim 35, further comprising:
directing the pulsed laser beam onto a circular aperture such that central beam bundles of the laser beam are absorbed by the aperture and marginal beam bundles of the laser beam pass around the aperture and form the ring of laser radiation on the marginal area of the focusing optic element.

37. The method of claim 35, further comprising:
directing the pulsed laser beam through an axicon to form the ring of laser radiation on the marginal area of the focusing optic element.

38. The method of claim 37, further comprising:
collimating the pulsed laser beam with a collimating lens positioned between the axicon and the focusing optic element.

39. The method of claim 35, wherein:
the laser beam focal line has a length extending along the beam propagation direction that is in a range of between about 0.1 mm and about 100 mm.

40. The method of claim 35, wherein:
the laser beam focal line has an average spot diameter that is in a range of between about 0.1 µm and about 5 µm.

41. The method of claim 35, wherein the laser beam focal line has a length extending along the beam propagation direction that is in a range of between about 0.1 mm and about 100 mm and an average spot diameter that is in a range of between about 0.1 µm and about 5 µm.

* * * * *